United States Patent
Pudipeddi et al.

(10) Patent No.: US 9,893,553 B2
(45) Date of Patent: Feb. 13, 2018

(54) METHOD AND SYSTEM FOR SIMULTANEOUSLY WIRELESSLY CHARGING PORTABLE RECHARGEABLE DEVICES BASED ON WIRELESS INDUCTIVE POWER TRANSFER WITH SEAMLESS FREE POSITIONING CAPABILITY

(71) Applicant: Pavan Pudipeddi, Austin, TX (US)

(72) Inventors: Pavan Pudipeddi, Austin, TX (US); Anandaram Katragadda, Bangalore (IN); Naveen Chava, Bangalore (IN)

( * ) Notice: Subject to any disclaimer, the term of this patent is extended or adjusted under 35 U.S.C. 154(b) by 0 days.

(21) Appl. No.: 14/583,095

(22) Filed: Dec. 25, 2014

(65) Prior Publication Data

US 2016/0190851 A1 Jun. 30, 2016

Related U.S. Application Data

(60) Provisional application No. 61/920,487, filed on Dec. 24, 2013, provisional application No. 61/923,785, filed on Jan. 6, 2014, provisional application No. 62/006,277, filed on Jun. 2, 2014.

(51) Int. Cl.
*H02J 7/00* (2006.01)
*H02J 7/02* (2016.01)
*H02J 50/10* (2016.01)
*H02J 50/40* (2016.01)
*H02J 50/90* (2016.01)

(52) U.S. Cl.
CPC .............. *H02J 7/025* (2013.01); *H02J 50/10* (2016.02); *H02J 50/40* (2016.02); *H02J 50/90* (2016.02); *Y02B 60/50* (2013.01)

(58) Field of Classification Search
CPC ...... Y02T 90/122; B60L 11/182; Y02E 60/12; H02J 7/025; H01F 38/14

USPC ......................................................... 320/108
See application file for complete search history.

(56) References Cited

U.S. PATENT DOCUMENTS

| | | | |
|---|---|---|---|
| 7,399,202 B2 | 7/2008 | Dayan et al. | |
| 2009/0015197 A1* | 1/2009 | Sogabe | H02J 7/0011 320/108 |
| 2010/0259217 A1* | 10/2010 | Baarman | H02J 5/005 320/108 |
| 2011/0050164 A1 | 3/2011 | Partovi et al. | |
| 2011/0050382 A1* | 3/2011 | Baarman | H01F 1/26 336/221 |
| 2012/0049991 A1* | 3/2012 | Baarman | H01F 17/0013 336/199 |
| 2012/0112553 A1 | 5/2012 | Stoner, Jr. et al. | |
| 2013/0207599 A1 | 8/2013 | Ziv et al. | |
| 2014/0182923 A1* | 7/2014 | Gerken | H05K 9/00 174/355 |

* cited by examiner

*Primary Examiner* — Arun Williams

(57) ABSTRACT

Embodiments of the present invention specifically relate to a system for seamlessly and simultaneously wirelessly charging portable chargeable devices with free positioning capability and a method therefor. The system comprises a charging subsystem. The charging subsystem comprises an electromagnetic shield for minimization of interference, and a transmitter coil array. The transmitter coil array comprises a first plurality of transmitter coils juxtaposed to each other and coupled to the electromagnetic shield, and a second plurality of transmitter coils, wherein each of the second plurality of transmitter coils is overlappingly coupled to at least a pair of the first plurality of transmitter coils in juxtaposition and positioned thereunder, and at least a controller for scanning the transmitter coils and selectively activating and deactivating the transmitter coils based on the detection of receiver coils positioned at any position relative to the transmitter coils, and a portable chargeable device comprising a receiver coil, wherein the system facilitates minimization of interference between the transmitter coils in juxtaposition.

22 Claims, 12 Drawing Sheets

METHOD AND SYSTEM FOR SIMULTANEOUSLY WIRELESSLY CHARGING PORTABLE RECHARGEABLE DEVICES BASED ON WIRELESS INDUCTIVE POWER TRANSFER WITH SEAMLESS FREE POSITIONING CAPABILITY

CROSS-REFERENCE TO RELATED APPLICATIONS

This application claims the benefit of, is a continuation, and is a continuation-in-part of the following provisional applications, which are hereby incorporated by reference in its entirety: U.S. Provisional Patent Application No. 61/920,487, captioned "METHOD AND SYSTEM FOR SIMULTANEOUSLY WIRELESSLY CHARGING PORTABLE CHARGEABLE DEVICES BASED ON WIRELESS INDUCTIVE POWER TRANSFER WITH SEAMLESS FREE POSITIONING CAPABILITY" filed Dec. 24, 2013, U.S. Provisional Patent Application No. 61/923,785, captioned "METHOD AND SYSTEM FOR AUGMENTING USABILITY IN CONNECTION WITH WIRELESS COMMUNICATION AND POWER MANAGEMENT THEREOF" filed Jan. 6, 2014, and U.S. Provisional Patent Application No. 62/006,277, captioned "IMPROVED METHOD AND SYSTEM FOR SIMULTANEOUSLY WIRELESSLY CHARGING PORTABLE CHARGEABLE DEVICES BASED ON WIRELESS INDUCTIVE POWER TRANSFER WITH SEAMLESS FREE POSITIONING CAPABILITY" filed Jun. 2, 2014.

BACKGROUND OF THE INVENTION

Field of the Invention

Embodiments of the present invention generally relate to wireless power transfer, and more particularly, to simultaneously wirelessly charging portable chargeable devices based on wireless inductive power transfer with enhanced qualitative and quantitative parameters, such as economic feasibility, easy usability, seamless free positioning capability, minimal cross-interference and maximal power transfer efficiency.

Description of the Related Art

Wireless or contactless battery charging has undergone some developments in recent years owing to the enhanced user experience and reliability of not having to use connectors, and the advantages of having universal wireless chargers for any kind of electronic devices, like laptops, mobiles etc.

One major problem is free positioning of portable devices on a wireless charger thereby facilitating seamless charging of the portable devices thereupon.

Some solutions for charging multiple mobile phones simultaneously provide for a common transmitter pad, wherein one or more independent charging systems may be used. However, the seamless free positioning capability is lost on account of physical demarcation between the independent charging systems.

In certain scenarios involving charging of multiple mobile phones using a common charger pad, highly resonant wireless power transfer provides a better user experience in terms of three dimensional free positioning capabilities. However, the total cost of the equipment turns out to be higher on account of usage of the advanced technology, in addition to the separate communications requirements that needs to be built into the wireless charger. Thus, highly resonant wireless power transfer and similar technologies may not find wide acceptance in a worldwide consumer market, unless costs are acceptable. Additionally, the highly resonant wireless power transfer and similar technologies may fail to charge existing mobile phones that already have wireless power capability.

In certain scenarios involving charging of at least one of a single portable computing and communications device using the free positioning capability, and at least a pair of the portable computing and communication devices, there is likelihood or probability of occurrence of one or more events, such as at least one of power transfer and communications events, at least one of simultaneously and separately, owing to at least a pair of transmitter coils comprising the transmitter coil array, in any point in time. In general, an electromagnetic shield that serves the transmitter coils, in entirety, as a common electromagnetic shield is used. The electromagnetic shield maximizes the power transfer efficiency via directing the flux paths. However, as a consequence, the electromagnetic shield provides for a common impedance path thereby resulting in cross-interference amid two or more transmitter coils.

One solution to the problem of cross-interference is introduction of a gap in the electromagnetic shield thereby facilitating elimination of cross-interference amid two or more transmitter coils. However, the introduction of the gap may have an impact on the efficiency of power transfer, and is thus not recommended.

Therefore, there is still a need for the design and implementation of methods and systems for streamlined, simultaneous wireless charging of portable chargeable devices based on wireless inductive power transfer with enhanced qualitative and quantitative parameters, such as economical, easy usability, seamless free positioning capability, minimal cross-interference and maximal power transfer efficiency.

SUMMARY OF THE INVENTION

Embodiments of the present invention specifically relate to a system and method for seamlessly and simultaneously wirelessly charging portable rechargeable devices, the system comprising a charging subsystem comprising a controller, an electromagnetic shield for maximization of power transfer efficiency, and a transmitter coil array comprising a first plurality of transmitter coils in juxtaposition and coupled to the electromagnetic shield, and each of a second plurality of transmitter coils overlappingly coupled to at least a pair of the first plurality of transmitter coils in juxtaposition and positioned thereunder, and a controller for sequentially scanning each of the transmitter coils in the transmitter coil array and selectively activating and deactivating the transmitter coils based on the detection of presence of receiver coils positioned at any position relative to the transmitter coils, and a portable chargeable device comprising a receiver coil, wherein the system facilitates maximization of power transfer efficiency while minimization of cross-interference between the transmitter coils in juxtaposition.

These and other systems, processes, methods, objects, features, and advantages of the present invention will be apparent to those skilled in the art from the following detailed description of the preferred embodiment and the drawings. All documents mentioned herein are hereby incorporated in their entirety by reference.

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the method and system is described herein by way of example for several embodiments and illustrative drawings, those skilled in the art will recognize that the method and system for simultaneously wirelessly charging portable chargeable devices based on wireless inductive power transfer with seamless free positioning capability, is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and system for simultaneously wirelessly charging portable chargeable devices based on wireless inductive power transfer with seamless free positioning capability defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of a method and system for simultaneously wirelessly charging portable chargeable devices based on wireless inductive power transfer with seamless free positioning capability and improved electromagnetic shield structure are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Figure 1:
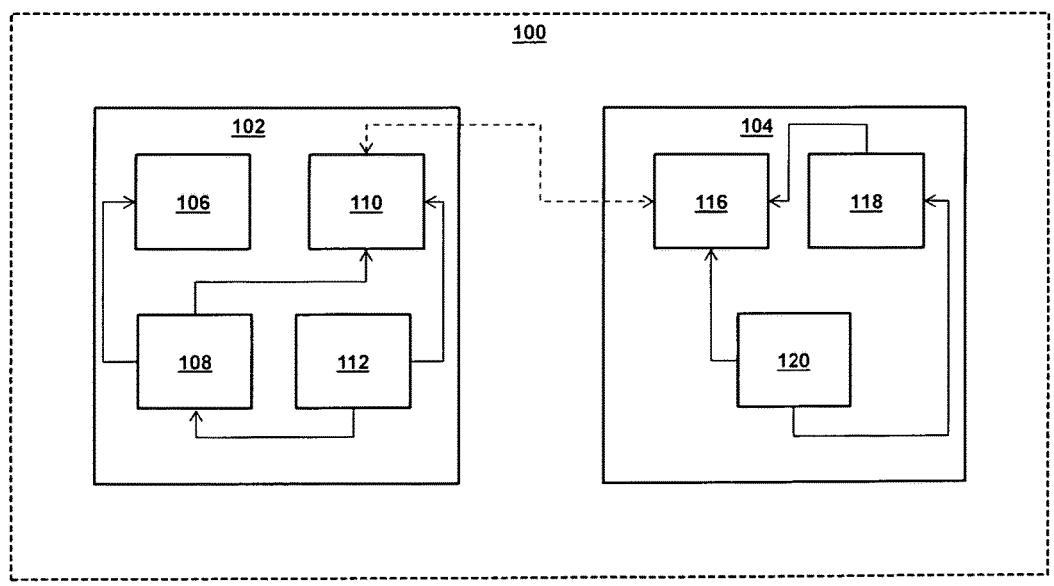
FIG. 1 depicts a block diagram of a system for simultaneously wirelessly charging portable chargeable devices using wireless inductive power transfer with seamless free positioning capability, according to one or more embodiments.

FIG. 1 depicts a block diagram of a system 100 for simultaneously wirelessly charging portable chargeable/rechargeable devices using wireless inductive power transfer with streamlined and seamless, free positioning capability, according to one or more embodiments.

The system 100 may comprise a charging subsystem 102 and one or more portable chargeable devices 104. For purposes of clarity and expediency, the system 100 may be hereinafter referred to as an Adaptive Position Free (APF) wireless charging system.

In some embodiments, each of the portable chargeable devices 104 may be at least one of a portable computing device, portable communications device and a combination thereof, for instance a portable computing and communications device.

In some embodiments, each of the portable computing devices may be at least one of a portable computer, tablet computer, Personal Digital Assistant (PDA), an ultra mobile PC, a smart phone, carputer, portable communications, pentop computer, wearable computer, such as a smart watch, and the like. Likewise, in some embodiments, each of the portable communications devices may be at least one of a mobile device, and the like.

The charging subsystem 102 may comprise a shield 106, at least a first controller 108, a transmitter coil array 110 and a first power source 112.

For purposes of clarity and expediency, the charging subsystem 102 may be hereinafter interchangeably referred to as at least one of a base station and power transmitter.

Specifically, in use, the charging subsystem 102 may facilitate simultaneously wirelessly charging portable chargeable/rechargeable devices 104 using wireless inductive power transfer with streamlined and seamless, free positioning capability.

In some embodiments, for example, and in no way limiting the scope of the invention, the shield 106 may be at least one of an electric, a magnetic and an electromagnetic shield.

In some embodiments, the shield employed may be at least one of a composite (or compact) modular and single shield, designed in accordance with the principles of the present invention. Specifically, the composite modular shield may comprise one or more sets of shield blocks (i.e. sets of one or more individual modular shield blocks) thereby facilitating realization or formation of at least one of asymmetric and symmetric shielding zones, wherein each of the sets of shield blocks may comprise one or more individual modular shield blocks possessing homogeneous specifications, for instance material, constructional, dimensional, geometrical, spatial position and orientation specifications therefor.

In some embodiments involving isolation from external magnetic fields, use of a magnetic shield is disclosed, in accordance with the principles of the present invention. For example, in some scenarios involving static or slowly varying magnetic fields below approximately 100 kHz, the Faraday shielding may be ineffective. Thus, shields made of metal alloys with high magnetic permeability may be used, such as sheets of Permalloy and Mu-Metal, or ferromagnetic metal coatings with nano-crystalline grain structure. In use, the aforementioned materials may not block the magnetic field, as with electric shielding; rather draw the magnetic field into the aforementioned materials, thereby facilitating providing a path for the magnetic field lines around the shielded volume. In some scenarios, the best shape for magnetic shields may thus be a closed container surrounding the shielded volume. The effectiveness of the magnetic shielding depends on the permeability of the material, which generally drops off at both very low magnetic field strengths and at high field strengths, wherein the material may become saturated. In order to achieve low residual fields, the magnetic shields may often consist of several enclosures one inside the other, each of which successively reduces the field therein. In some scenarios, in use, a magnetic shield, for instance the shield 106, may facilitate maximizing the power transfer efficiency via directing the flux paths.

In some scenarios, in use, an electromagnetic shield, for instance the shield 106, may facilitate reducing the electromagnetic field by blocking the electromagnetic field. For example, and in no way limiting the scope of the invention, the electromagnetic shield 106 may be made of at least one of conductive and magnetic materials. For instance, in some embodiments, the electromagnetic shield 106 may be made of at least one of a sheet metal, metal screen, metal foam and a combination thereof.

The amount of reduction of the electromagnetic field resulting from the electromagnetic shield 106 may depend on one or more factors, namely 1) the material, and the thickness therefor, 2) the size of the shielded spatial volume and 3) the frequency of the fields of interest and 4) the size, shape and orientation of apertures in the shield to an incident electromagnetic field.

The transmitter coil array 110 may facilitate generation of electromagnetic field. The transmitter coil array 110 may comprise one or more transmitter coils (not shown here explicitly). In some embodiments, for example, and in no way limiting the scope of the invention, the transmitter coil array 110 may include six (6) transmitter coils.

In some embodiments, at least one of the charging subsystem 102 and components thereof may be at least one of partially and fully disposed in a first housing element 114 (not shown here explicitly).

The first controller 108 may be coupled to the transmitter coil array 110 and first power source 112.

In some embodiments, the first controller 108 may be in essence a programmable microcontroller.

In operation, the first controller 108 may facilitate managing the operations of the one or more transmitter coils of the transmitter coil array 110.

Each of the portable chargeable devices 104 may comprise a receiver coil 116, a second controller 118 and a second power source 120.

The second controller 118 may be coupled to the receiver coil 116 and second power source 120. The second controller 118 may be in essence a programmable microcontroller.

In some embodiments, at least one of the portable chargeable devices 104 and components thereof may be at least one of partially and fully disposed in a second housing element 122 (not shown here explicitly).

However, in other embodiments, the components of the charging subsystem 102 and the portable chargeable devices 104 may be modified and coupled together differently in any suitable manner without departing from the spirit and scope of the present invention.

In operation, power may be transmitted or transferred wirelessly between the transmitter coil array 110 and one or more receiver coils 116 via wireless power coupling. In typical settings for charging small mobile devices, e.g., cell phones, smart phones, PDAs, music players, sound recorders, portable gaming consoles, wireless headsets, GPS devices, etc., the wireless power coupling is a known inductive coupling.

Each of the transmitter coils in the transmitter coil array 110 may facilitate generating an electromagnetic field upon application or supply of power thereto using the first power source 112. The generated electromagnetic field may facilitate inducing a power flow in the receiver coil 116 upon proper alignment of the receiver coil 116 in the generated electromagnetic field. The power flow in the receiver coil 116 may be used to power the portable computing and communications device 104 and/or recharge the second power source 120. The configuration of each of the transmitter coils in the transmitter coil array 110 and at least one receiver coil 116, e.g., the number of turns of the coils around a core, the composition of the core, the composition of the coils (including wire gauge), the dimensions of the core and coils, etc., may be designed to provide an efficient wireless power transfer between the primary and secondary coils, as would be apparent to one of skill in the art.

The first controller 108 of the charging subsystem 102 may be configured to control the operation of the portable computing and communications device 104. For example, by controlling the voltage and/or current supplied from the first power source 112 to the transmitter coil array 110 so that the electromagnetic field generated by the transmitter coil array 110 may efficiently induce appropriate voltage and current waveforms in the receiver coil 116 of the portable computing and communications device 104. In some embodiments, the voltage and/or current supplied to the transmitter coil array 110 may be controlled by other known power conditioning/regulating components. Similarly, the second controller 118 of the portable computing and communications device 104 may be configured to control the operation of the portable computing and communications device 104. For example, by regulating and/or converting the voltage and/or current received by the receiver coil 116 to provide appropriate power levels to charge the second power source 120, and other components of the portable computing and communications device 104.

In operation, in some scenarios, the first controller 108 may facilitate sequentially scanning each of the transmitter coils in the transmitter coil array 110. Upon detection of the presence of the receiver coils 116 of the one or more portable chargeable devices 104 on the charging subsystem 102 positioned at one or more positions relative to the transmitter coils, the first controller 108 may facilitate at least one of selectively activating and deactivating the transmitter coils thereby facilitating minimization of cross-interference therebetween.

In some embodiments, one or more potential overall physical configurations in connection with the charging subsystem are disclosed, in accordance with the principles of the present invention. Specifically, the overall physical configuration in connection with the charging subsystem comprises material, constructional, dimensional, geometrical, spatial position and orientation specifications regarding the charging subsystem, and transmitter coil array thereof. In some embodiments, the charging subsystem and transmitter coil array thereof possess apposite material, constructional, dimensional, geometrical, spatial position and orientation specifications, designed in accordance with the principles of the present invention.

Figure 2:
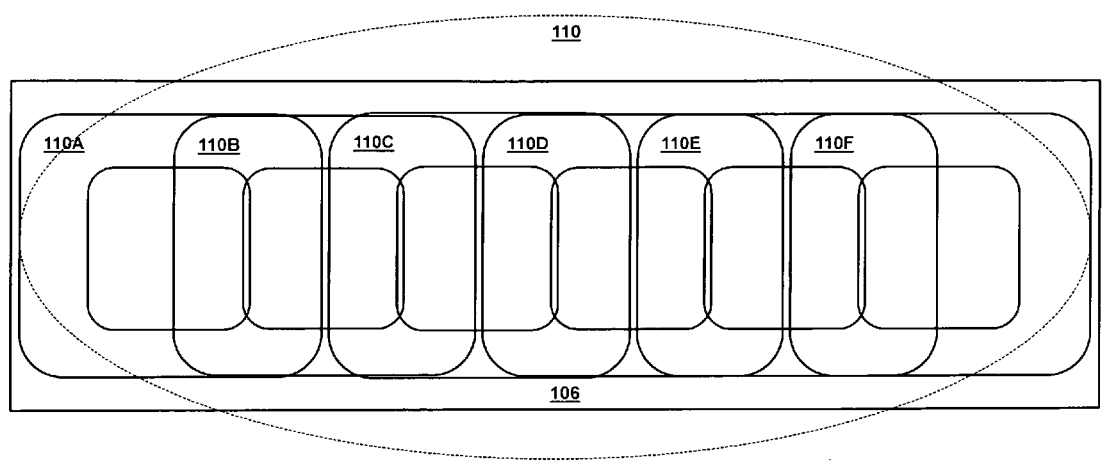
FIG. 2 depicts one potential overall physical configuration in connection with the charging subsystem 102, and transmitter coil array 110 thereof, of FIG. 1, in accordance with one or more embodiments.

FIG. 2 depicts an exemplary potential overall physical configuration in connection with the charging subsystem 102, and transmitter coil array 110 thereof, of FIG. 1, in accordance with one or more embodiments.

As depicted in FIG. 2, the transmitter coil array 110 may comprise one or more transmitter coils. In some embodiments, for example, and in no way limiting the scope of the invention, the transmitter coil array 110 may include six (6) transmitter coils. For purposes of clarity and expediency, the transmitter coil array 110 including the six (6) transmitter coils may be divided into two sub-arrays, namely odd and even numbered transmitter coils. Specifically, the odd numbered transmitter coils may include three (3) transmitter coils that have been hereinafter referred to as a first transmitter coil 110A, third transmitter coil 110C and fifth transmitter coil 110E respectively. Likewise, the even numbered transmitter coils may include three (3) transmitter coils that have been hereinafter referred to as a second transmitter coil 110B, fourth transmitter coil 110D and sixth transmitter coil 110F respectively.

In some embodiments, by virtue of the overall physical configuration in connection with the charging subsystem 102, and the transmitter coil array 110 thereof, the system 100 may facilitate charging of at least a pair of portable computing and communications device 104.

For example, and in no way limiting the scope of the invention, the charging subsystem 102 and transmitter coil array 110 thereof may possess the following material, constructional, dimensional, geometrical, spatial position and orientation specifications, namely 1) material of the shield 106 may be ferrite; 2) optional geometry of the shield 106 may be three-dimensional (3D) solid rectangular cuboid with or without rounded corners; 3) length, breadth and height, i.e. dimensions, of the shield 106 may be approximately 84 mm*160 mm*10 mm; 4) length and breadth, i.e. dimensions, of each of the transmitter coils in the transmitter coil array 110 may be approximately 45 mm*52 mm; 5) number of the transmitter coils in the transmitter coil array 110 may be 6; 6) optional geometry of each of the transmitter coils in the transmitter coil array 110 may be three-dimensional (3D) hollow rectangular lamina with rounded corners; 7) relative spatial positioning of each of the transmitter coils in the transmitter coil array 110 with respect to the shield 106 may be such that each of the odd numbered transmitter coils, namely the first 110A, third 110C and fifth 110E in that order, may be directly coupled to the shield 106, and may be thus positioned thereupon, whereas each of the even numbered transmitter coils, namely the second 110B, fourth 110D and sixth 110F in that order, may be directly coupled to a pair of immediately preceding and proceeding odd numbered transmitter coils, flanking, or juxtaposed to, each other, and may be positioned immediately beneath each of the even numbered transmitter coils; 8) relative inter-coil spatial positioning of the odd numbered transmitter coils may be such that the first 110A, third 110C and fifth 110E transmitter coils in that order may be juxtaposed in close vicinity to each other in a continuous linear fashion; 9) relative inter-coil spatial positioning of the even numbered transmitter coils may be such that the second 110B, fourth 110D and sixth 110F transmitter coils in that order may be proximately juxtaposed to each other in a continuous linear fashion; 10) relative inter-coil spatial positioning of both even and odd numbered transmitter coils may be such that each of the even numbered transmitter coils may partially overlap with a pair of immediately preceding and proceeding odd numbered transmitter coils; 11) inter transmitter coil array edge and the shield 106 length spacing may be less than approximately 5 mm; 12) inter transmitter coil array edge and the shield 106 breadth spacing may be approximately 5 mm.

In some best case scenarios, in operation, each of the six (6) transmitter coils, namely first 110A, second 110B, third 110C, fourth 110D, fifth 110E and sixth 110F, may be continuously sequentially scanned.

Advantageously, in some worst case scenarios involving random positioning of a single portable chargeable device 104 on the charging subsystem 102, the overall physical configuration in connection with the charging subsystem 102 and transmitter coil array 110 thereof may provide necessary and sufficient (or optimal) alignment between the receiver 116 and each of the transmitter coils 110A-F in the transmitter coil array 110. For example, and by no way of limitation, at least a minimum of approximately 70% alignment may be achieved between the receiver coil 116 and each of the transmitter coils 110A-F in the transmitter coil array 110 in case a single portable computing and communications device 104 may be positioned on at least one of the top-left and bottom-right corners of the charging subsystem 102.

In some embodiments, the system may facilitate streamlined and seamless free positioning of one or more portable chargeable devices manually on the charging subsystem thereby eliminating the need for guided or selective positioning.

FIGS. 3A-F depicts an assortment of possibilities, and corresponding use case scenarios, in connection with the positioning of the portable chargeable devices 104 relative to the charging subsystem 102, of FIG. 1, in accordance with one or more embodiments.

Figure 3A:
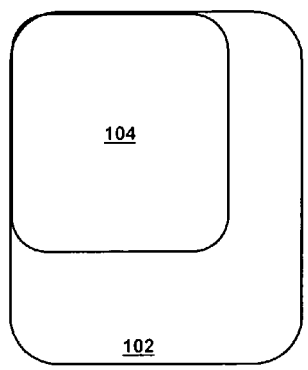
FIGS. 3A-F depicts an assortment of possibilities, and corresponding use case scenarios, in connection with the positioning of the portable chargeable devices 104 relative to the charging subsystem 102, of FIG. 1, in accordance with one or more embodiments.

As depicted in FIG. 3A, in some use case scenarios, the system 100 may facilitate manual positioning of the portable computing and communication device 104 at a top-left position relative to the charging subsystem 102 by a user.

Figure 3B:
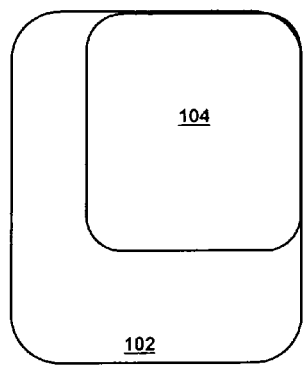

As depicted in FIG. 3B, in some use case scenarios, the system 100 may facilitate manual positioning of the portable computing and communication device 104 at a top-right position relative to the charging subsystem by a user.

Figure 3C:
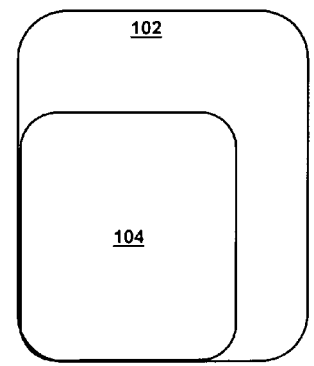

As depicted in FIG. 3C, in some use case scenarios, the system 100 may facilitate manual positioning of the portable computing and communication device 104 at a bottom-left position relative to the charging subsystem by a user.

Figure 3D:
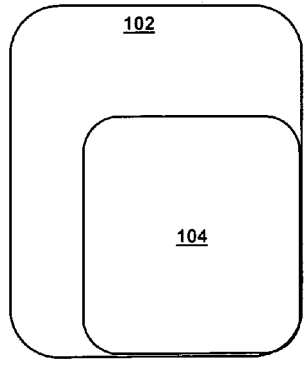

As depicted in FIG. 3D, in some use case scenarios, the system 100 may facilitate manual positioning of the portable computing and communication device 104 at a bottom-right position relative to the charging subsystem by a user.

Figure 3E:
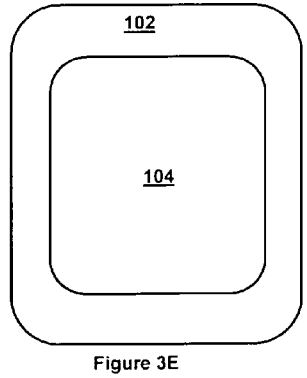

As depicted in FIG. 3E, in some use case scenarios, the system 100 may facilitate manual positioning of the portable computing and communication device 104 at a central position relative to the charging subsystem by a user.

Figure 3F:
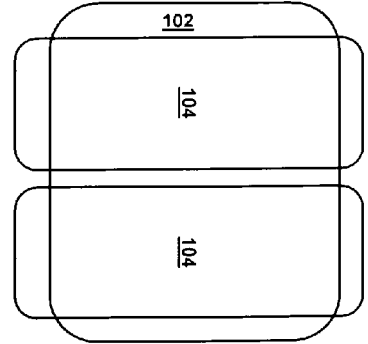

As depicted in FIG. 3F, in some use case scenarios, the system 100 may facilitate manual positioning of at least a pair of portable computing and communication devices 104 at central positions relative to the charging subsystem by a user, wherein the pair of the portable computing and communication devices 104 are juxtaposed in at least one of proximity and vicinity of each other.

In some embodiments, adaptive free positioning capability of the system by virtue of the overall physical configuration of the charging subsystem, and transmitter coil array thereof, as well as selective activation and deactivation of the transmitter coils constituting the transmitter coil array is disclosed, in accordance with the principles of the present invention.

In some scenarios, the system 100, of FIG. 1, may facilitate charging at least one portable computing and communications device 104 and at least a pair of additional portable computing and communication devices 104 using the free positioning capability, wherein the pair of additional devices 104 may be centrally positioned relative to the charging subsystem 102, and wherein the pair of additional devices 104 may be juxtaposed in at least one of proximity and vicinity of each other. Thus, there may be a likelihood or probability of occurrence of one or more events, such as at least one of power transfer and communications events, at least one of simultaneously and separately, owing to at least a pair of transmitter coils constituting the transmitter coil array 110, in any point in time.

Reiterating again, the magnetic shield 106 may facilitate maximizing the power transfer efficiency via directing the flux paths. However, as a consequence, the magnetic shield 106 may facilitate providing for a common impedance path thereby resulting in cross-interference amid two or more transmitter coils, constituting the transmitter coil array 110, juxtaposed in at least one of proximity and vicinity of each other.

In some embodiments, introduction of a gap in the shield facilitates elimination of cross-interference amid two or more transmitter coils. However, the introduction of the gap may have an impact on the efficiency of power transfer, and thus there has to be a trade-off between introduction of the gap and corresponding impact on the efficiency of power transfer.

In some embodiments, a method for selectively activating and deactivating one or more transmitter coils constituting the transmitter coil array is disclosed, in accordance with one or more embodiments. Specifically, the method facilitates achievement of efficient power transfer and reliable communications between the transmitter and receiver coils despite the presence of the common impedance path introduced by the shield leading to cross-interference amid two or more transmitter coils.

Figure 4:
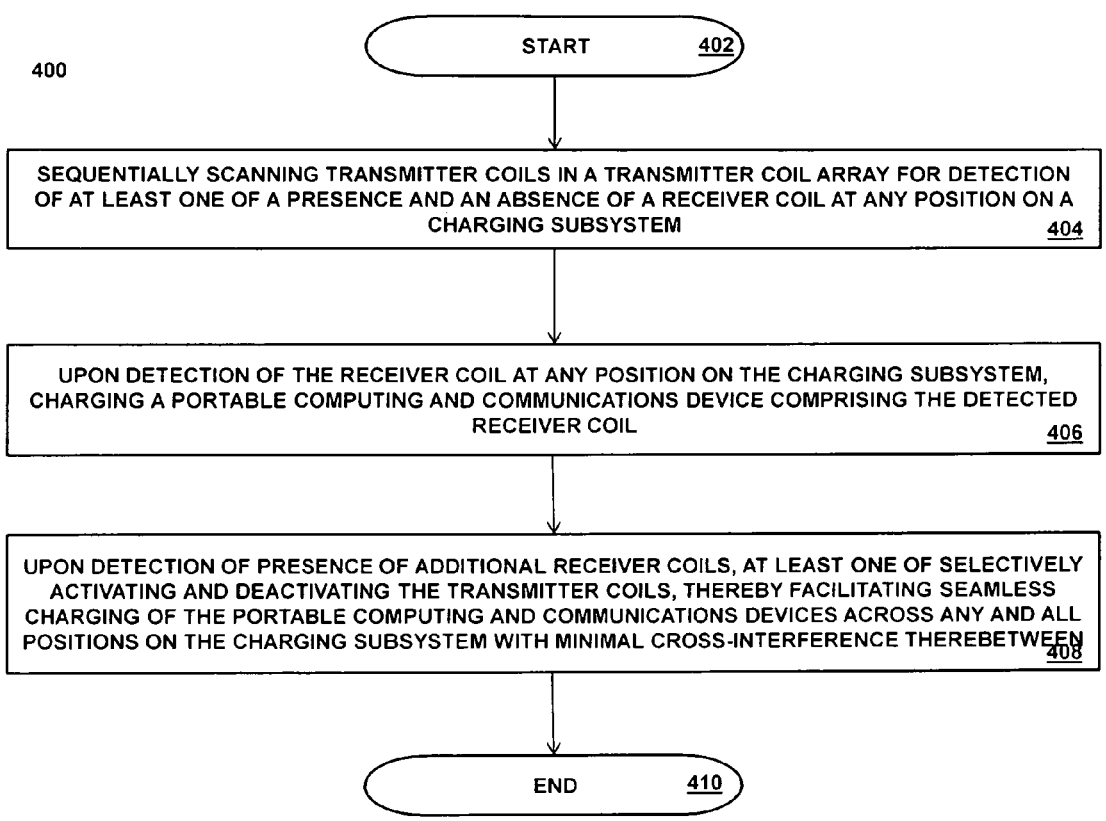
FIG. 4 depicts a flow diagram for a method for selective activation and deactivation of one or more transmitter coils comprising the transmitter coil array, in accordance with one or more embodiments.

FIG. 4 depicts a flow diagram for a method for at least one of selectively activating and deactivating one or more transmitter coils constituting the transmitter coil array, in accordance with one or more embodiments.

The method 400 may start at step 402 and may proceed to step 404. In some embodiments, for example, and in no way limiting the scope of the invention, the method 400 may be implemented by a controller, for instance the first controller 108, of FIG. 1.

At step 404, the method 400 may facilitate, or comprise, sequentially scanning one or more transmitter coils in a transmitter coil array for detection of at least one of a presence and an absence of a receiver coil at any position on a charging subsystem, for instance the charging subsystem 102 of FIG. 1. In some embodiments, for example, and in no way limiting the scope of the invention, each transmitter coil of a transmitter coil array, for instance each of the transmitter coils 110A-F of the transmitter coil array 110 of FIGS. 1-2, may be sequentially scanned for detection of at least one of presence and absence of a receiver coil, for instance the receiver coil 116, at any position on the charging subsystem 102.

In some scenarios involving detection of at least one of presence and absence of any portable computing and communications device, the receiver coil thereof may be detected at any position on the charging subsystem. In some embodiments, for example, and in no way limiting the scope of the invention, the receiver coil 116 may be detected at any given position on the charging subsystem 102.

At step 406, upon detection of the receiver coil at any position on the charging subsystem, the method 400 may facilitate, or comprise, charging a portable computing and communications device comprising the detected receiver coil. In some embodiments, for example, and in no way limiting the scope of the invention, a portable computing and communications device, for instance the device 104, comprising the receiver coil 116 may be subjected to wireless charging.

In some scenarios involving deployment of the system for securely wirelessly charging a proprietary portable computing and communications device, upon detection of the receiver coil thereof at any position on the charging subsystem, the method 400 may facilitate, or further comprise, authenticating and authorizing the proprietary portable computing and communications device for purposes of charging. In some scenarios, in the event that an additional proprietary portable computing and communications device may request charging on the charging subsystem upon manual positioning of the additional device thereon, the method 400 may facilitate, or further comprise, charging the additional proprietary portable computing and communications device subsequent to successful authentication and authorization of the additional device. In some scenarios, in the event that yet another additional proprietary portable computing and communications device may request charging on the charging subsystem upon manual positioning of the device thereon, the method 400 may facilitate, or further comprise, charging the yet another additional proprietary portable computing and communications device subject to at least one of execution and non-execution of the tests for authentication and authorization.

At step 408, upon detection of presence of one or more additional receiver coils, the method 400 may facilitate, or further comprise, at least one of selectively activating and deactivating the one or more transmitter coils, thereby facilitating seamless charging of additional portable computing and communications devices comprising the additional receiver coils across any and all positions on the charging subsystem with minimal cross-interference therebetween. The method 400 may proceed to step 410 and end.

Table 1 discloses an exemplary tabular representation in connection with proprietary control logic facilitating managing interoperability of the transmitter coils constituting the transmitter coil array based at least in part on one or more potential shield structures, potential coil configurations and a combination thereof, designed and implemented in accordance with the principles of the present invention.

| RECEIVER (RX) COIL DETECTED AT | TRANSMITTER (TX) COILS ACTIVATION AND DEACTIVATION AND INTEROPERABILITY SCHEME THEREBETWEEN ACTION BASED TRANSMITTER (TX) COIL STATE | |
|---|---|---|
| TRANSMITTER (TX) COIL | DEACTIVATED | ACTIVATED |
| 1 | 2, 3 | 4, 5, 6 |
| 2 | 1, 3, 4 | 5, 6 |
| 3 | 1, 2, 4, 5 | 6 |
| 4 | 2, 3, 5, 6 | 1 |
| 5 | 3, 4, 6 | 1, 2 |
| 6 | 4, 5 | 1, 2, 3 |

In some embodiments, implementation of the proprietary control logic facilitating managing interoperability of the transmitter coils constituting the transmitter coil array based at least in part on one or more potential shield structures, potential coil configurations and a combination thereof is disclosed, in accordance with the principles of the present invention. Specifically, the first controller may facilitate implementation of the proprietary control logic facilitating defining one or more at least one of selective activation and deactivation schemes in connection with the transmitter coils thereby facilitating managing interoperability therebetween.

In some embodiments, the first controller may be in essence a programmable microcontroller and may comprise a memory unit, microprocessor unit and an I/O unit. Specifically, the memory unit may comprise a control logic module facilitating implementation of the proprietary control logic, in turn, facilitating defining one or more of at least one of selective activation and deactivation schemes in connection with the transmitter coils, thereby facilitating managing interoperability therebetween.

Advantageously, in some embodiments, the system may facilitate simultaneous wirelessly charging at least a pair of portable chargeable devices using at least a pair of simultaneous communication channels based on wireless inductive power transfer whilst providing a common shield to maximize power transfer efficiency and facilitating at least one of selectively activating and deactivating transmitter coils to minimize cross-interference therebetween with seamless free positioning capability.

Still advantageously, in some embodiments, the system may facilitate charging of at least one of previous, current and future versions of Wireless Power Consortium (WPC) s'-QI compatible phones and receivers therefor in contrast to WPC's only promise for backward compatibility.

Still further advantageously, in some embodiments, the system may facilitate charging of at least one of previous, current and future versions of Power Matters Alliance (PMA) or ALLIANCE FOR WIRELESS POWER®-compatible phones and receivers therefor.

Yet, in other advantageous embodiments, the system may facilitate streamlined and seamless concurrent charging of multiple portable chargeable WPC-compatible devices with free positioning capability and both backward and forward compatibility therefor, in contrast to other technologies with a relatively higher level of engineering approach that may not be commercially viable in near future, and may also require increased cost on both transmitter and receiver side to be compatible with existing solutions.

In some embodiments, one or more potential overall physical configurations in connection with the charging subsystem, and transmitter coil array thereof, thereby facilitating at least one of zeroization and minimization of Electromagnetic Field (EMF), thermal and interference losses, whilst maximization of efficiency, are disclosed in accordance with the principles of the invention. In some specific embodiments, the shield may be custom-designed, in accordance with the principles of the present invention. Specifically, the shield may possess at least one of composite modular and monolithic design.

In some embodiments, the shield may comprise one or more sets of shield blocks thereby facilitating definition of asymmetric zones thereupon, wherein each of the sets of shield blocks may possess homogeneous specifications, for instance material, constructional, dimensional, geometrical, spatial position and orientation specifications therefor.

Figure 5A:
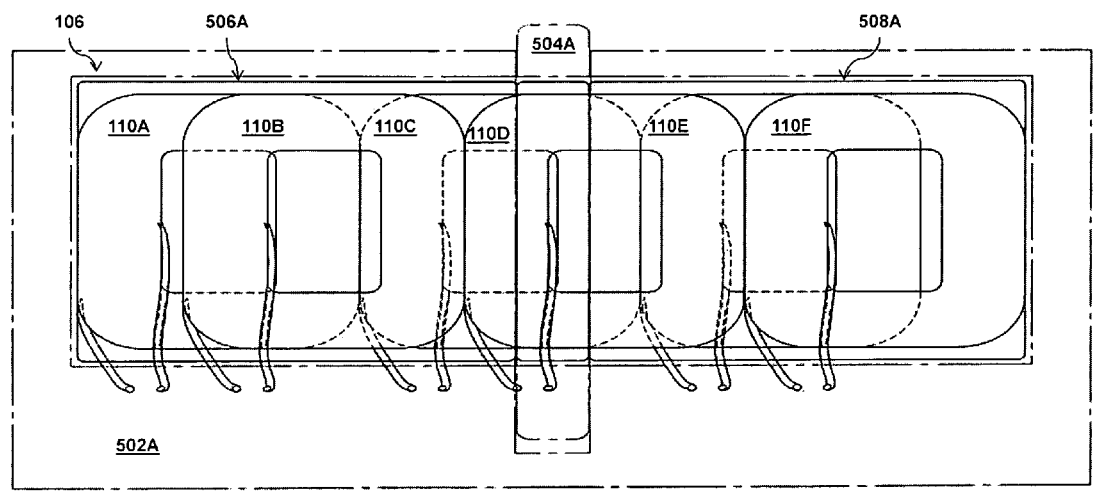
FIG. 5A depicts a second potential overall physical configuration in connection with the charging subsystem 102, and transmitter coil array 110 thereof, of FIG. 1, in accordance with one or more embodiments.

FIG. 5A depicts an exemplary second potential overall physical configuration in connection with the charging subsystem 102, and transmitter coil array 110 thereof, of FIG. 1, in accordance with one or more embodiments.

As depicted in FIG. 5A, the shield 106, of FIG. 1, may possess a composite modular design. For example, and in no way limiting the scope of the invention, the shield 106 may include at least two heterogeneous sets of shield blocks, wherein each shield block in each set of the two heterogeneous sets of shield blocks may possess homogeneous specifications, for instance material, constructional, dimensional, geometrical, spatial position and orientation specifications therefor. For purposes of clarity and expediency, the two heterogeneous sets of shield blocks may be hereinafter referred to as a first and set of shield blocks 502A and 504A. For example, and in no way limiting the scope of the invention, the first set of shield blocks 502A may include a pair of shield blocks, namely a first and second shield blocks 506A and 508A, with homogeneous specifications, for instance material, constructional, dimensional, geometrical, spatial position and orientation specifications therefor. Likewise, for example, and in no way limiting the scope of the invention, the second set of shield blocks 504A may include a single shield block, namely a third shield block 510A with distinct specifications.

As depicted in FIG. 5A, for example, and in no way limiting the scope of the invention, in accordance with the second potential overall physical configuration the charging subsystem 102, and transmitter coil array 110 thereof, may possess the following material, constructional, dimensional, geometrical, spatial position and orientation specifications, namely:

1) the material of a heat sink metallic plate (not shown and numbered here explicitly) may be a metal, for instance silver;

2) the optional geometry of the heat sink metallic plate may be a thin (or laminar) three-dimensional (3D) solid rectangular cuboid with or without rounded corners;

3) the length, breadth and height, i.e. dimensions, of the heat sink metallic plate may be approximately >55 mm*>145.10 mm*>=1 mm;

4) the spatial position and orientation of the heat sink metallic plate relative to the shield 106 may be such that the heat sink metallic plate may be juxtaposed beneath the shield 106 and coupled therewith;

5) the material of the shield 106 may be ferrite;

6) the constructional design or structure of the shield 106 may be composite modular type;

7) the total number of shield blocks 506A, 508A and 510A constituting the shield 106 may be 3;

8) the relative spatial positioning of each of the shield blocks 506A, 508A and 510A may be such that each of the shield blocks 506A, 508A and 510A may be proximally juxtaposed to each other without any slit or gap therebetween;

9) the optional geometry of each of the shield blocks 506A, 508A and 510A of the shield 106 may be a thin (or laminar) three-dimensional (3D) solid rectangular cuboid with or without rounded corners;

10) the length, breadth and height, i.e. dimensions, of the each of the shield blocks of the pair of shield blocks 506A and 508A of the shield 106 may be approximately 55 mm*67.05 mm*1 mm;

11) the length, breadth and height, i.e. dimensions, of the shield block 510A of the shield 106 may be approximately 55 mm*11 mm*0.7 mm;

12) the length and breadth, i.e. dimensions, of each of the transmitter coils in the transmitter coil array 110 may be approximately 43 mm*50 mm;

13) the total number of transmitter coils in the transmitter coil array 110 may be 6;

14) the optional geometry of each of the transmitter coils in the transmitter coil array 110 may be a thin three-dimensional (3D) hollow rectangular ring with rounded corners;

15) the relative spatial positioning of each of the transmitter coils in the transmitter coil array 110 with respect to the shield 106 may be such that each of the odd numbered transmitter coils, namely the first 110A, third 110C and fifth 110E in that order, may be directly coupled to the shield 106, and may be thus positioned thereupon, whereas each of the even numbered transmitter coils, namely the second 110B, fourth 110D and sixth 110F in that order, may be directly coupled to a pair of immediately preceding and proceeding odd numbered transmitter coils, flanking, or juxtaposed to, each other, and may be positioned immediately beneath each of the even numbered transmitter coils;

16) the relative inter-coil spatial positioning of the odd numbered transmitter coils may be such that the first 110A, third 110C and fifth 110E transmitter coils in that order may be juxtaposed in close vicinity to each other in a continuous linear fashion;

17) the relative inter-coil spatial positioning of the even numbered transmitter coils may be such that the second 110B, fourth 110D and sixth 110F transmitter coils in that order may be proximately juxtaposed to each other in a continuous linear fashion;

18) the relative inter-coil spatial positioning of both even and odd numbered transmitter coils may be such that each of the even numbered transmitter coils may partially overlap with a pair of immediately preceding and proceeding odd numbered transmitter coils;

19) the total inter transmitter coil array 110 and the shield 106 length-wise edge spacing may be approximately 5 mm, i.e. the total lengthwise spacing between the edges of the transmitter coil array 110 and the edges of the shield 106 may preferably be approximately 5 mm, for instance most preferably 5 mm;

20) the total inter transmitter coil array 110 and the shield 106 breadth-wise edge spacing may be approximately 0 mm, i.e. the total breadth-wise spacing between the edges of the transmitter coil array 110 and the edges of the shield 106 may be approximately 0 mm;

21) the inter external proximal edge distance between the first and second transmitter coils 110A and 110B, i.e. the distance between the outer proximal edges of the first and second transmitter coils 110A and 110B, may be approximately 16.10 mm;

22) the distance between the inner distal edge of the second transmitter coil 110B and the inner proximal edge of the third transmitter coil 110C is approximately 9.5 mm; and 23) the distance between the inner distal edge of the fourth transmitter coil 110D and the inner proximal edge of the fifth transmitter coil 110E may be approximately 9.5 mm.

Figure 5B:
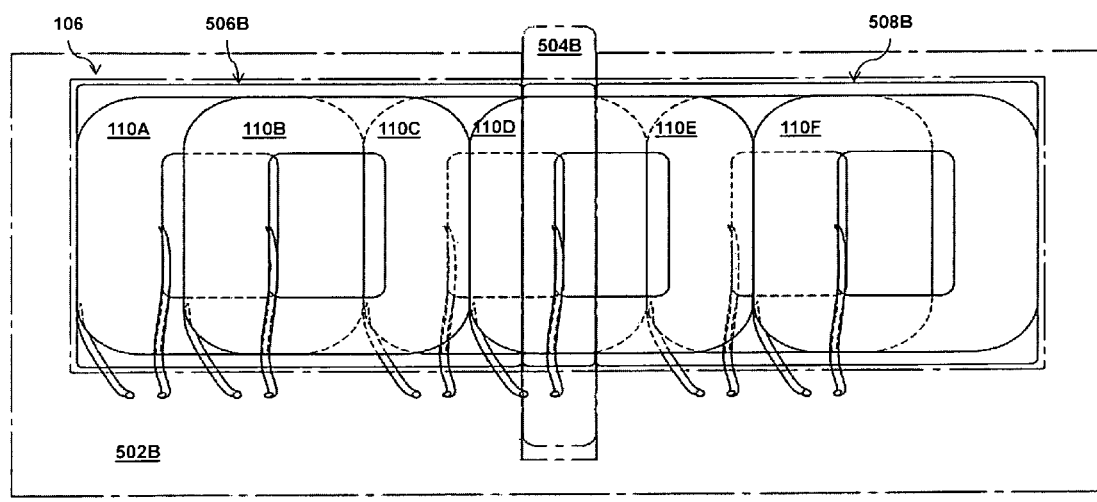
FIG. 5B depicts a third potential overall physical configuration in connection with the charging subsystem 102, and transmitter coil array 110 thereof, of FIG. 1, in accordance with one or more embodiments.

FIG. 5B depicts a third potential overall physical configuration in connection with the charging subsystem 102, and transmitter coil array 110 thereof, of FIG. 1, in accordance with one or more embodiments.

As depicted in FIG. 5B, the shield 106 may possess a composite modular design. For example, and in no way limiting the scope of the invention, the shield 106 may include at least two sets of shield blocks, wherein each of the two sets of shield blocks may possess homogeneous specifications, for instance material, constructional, dimensional, geometrical, spatial position and orientation specifications therefor. For purposes of clarity and expediency, the two sets of shield blocks may be hereinafter referred to as a first and set of shield blocks 502B and 504B. For example, and in no way limiting the scope of the invention, the first set of shield blocks 502B may include a pair of shield blocks, namely a first and second shield blocks 506B and 508B, with homogeneous specifications, for instance material, constructional, dimensional, geometrical, spatial position and orientation specifications therefor. Likewise, for example, and in no way limiting the scope of the invention, the second set of shield blocks 504B may include a single shield block, namely a third shield block 510B with distinct specifications.

As depicted in FIG. 5B, for example, and in no way limiting the scope of the invention, in accordance with the third potential overall physical configuration the charging subsystem 102, and transmitter coil array 110 thereof, may possess the following material, constructional, dimensional, geometrical, spatial position and orientation specifications, namely:

1) the material of a heat sink metallic plate (not shown and numbered here explicitly) may be a metal, for instance silver;

2) the optional geometry of the heat sink metallic plate may be a thin (or laminar) three-dimensional (3D) solid rectangular cuboid with or without rounded corners;

3) the length, breadth and height, i.e. dimensions, of the heat sink metallic plate may be approximately >55 mm*>151.70 mm*>=1 mm;

4) the spatial position and orientation of the heat sink metallic plate relative to the shield 106 may be such that the heat sink metallic plate may be juxtaposed beneath the shield 106 and coupled therewith;

5) the material of the composite modular shield 106 may be ferrite;

6) the constructional design or structure of the shield 106 may be a composite modular type;

7) the total number of shield blocks 506B, 508B and 510B constituting the shield 106 may be 3;

6) the optional geometry of each of the shield blocks of the shield 106 may be a thin (or laminar) three-dimensional (3D) solid rectangular cuboid with or without rounded corners;

9) the length, breadth and height, i.e. dimensions, of the each of the shield blocks of the pair of shield blocks 506B and 508B of the shield 106 may be approximately 55 mm*70.35 mm*1 mm;

10) the length, breadth and height, i.e. dimensions, of the shield block 510B of the shield 106 may be approximately 55 mm*11 mm*0.7 mm;

11) the length and breadth, i.e. dimensions, of each of the transmitter coils in the transmitter coil array 110 may be approximately 45.20 mm*53.2 mm;

12) the total number of transmitter coils in the transmitter coil array 110 may be 6;

13) the optional geometry of each of the transmitter coils in the transmitter coil array 110 may be thin three-dimensional (3D) hollow rectangular ring with rounded corners;

14) the relative spatial positioning of each of the transmitter coils in the transmitter coil array 110 with respect to the shield 106 may be such that each of the odd numbered transmitter coils, namely the first 110A, third 110C and fifth 110E in that order, may be directly coupled to the shield 106, and may be thus positioned thereupon, whereas each of the even numbered transmitter coils, namely the second 110B, fourth 110D and sixth 110F in that order, may be directly coupled to a pair of immediately preceding and proceeding odd numbered transmitter coils, flanking, or juxtaposed to, each other, and may be positioned immediately beneath each of the even numbered transmitter coils;

15) the relative inter-coil spatial positioning of the odd numbered transmitter coils may be such that the first 110A, third 110C and fifth 110E transmitter coils in that order may be juxtaposed in close vicinity to each other in a continuous linear fashion;

16) the relative inter-coil spatial positioning of the even numbered transmitter coils may be such that the second 110B, fourth 110D and sixth 110F transmitter coils in that order may be proximately juxtaposed to each other in a continuous linear fashion;

17) the relative inter-coil spatial positioning of both even and odd numbered transmitter coils may be such that each of the even numbered transmitter coils may partially overlap with a pair of immediately preceding and proceeding odd numbered transmitter coils;

18) the total inter transmitter coil array 110 and the shield 106 length-wise edge spacing may be approximately 5 mm, i.e. the total lengthwise spacing between the edges of the transmitter coil array 110 and the edges of the shield 106 may preferably be approximately 5 mm;

19) the total inter transmitter coil array 110 and the shield 106 breadth-wise edge spacing may be approximately 0 mm, i.e. the total breadth-wise spacing between the edges of the transmitter coil array 110 and the edges of the shield 106 may be approximately 0 mm;

20) the inter external proximal edge distance between the first and second transmitter coils 110A and 110B, i.e. the distance between the outer proximal edges of the first and second transmitter coils 110A and 110B, may be approximately 16.10 mm;

21) the distance between the inner distal edge of the second transmitter coil 110B and the inner proximal edge of the third transmitter coil 110C may be approximately 9.5 mm; and 22) the distance between the inner distal edge of the fourth transmitter coil 110D and the inner proximal edge of the fifth transmitter coil 110E may be approximately 9.5 mm.

In some embodiments, the shield may comprise of one or more sets of shield blocks. Specifically, each set of the sets of shield blocks may possess homogeneous specifications, for instance material, constructional, dimensional, geometrical, spatial position and orientation specifications therefor. More specifically, each shield block of the sets of shield blocks forming the shield may be juxtaposed in at least one of proximity and vicinity of each other thereby resulting in, or allowing or maintaining, a selectively adjustable gap therebetween. In some embodiments, the selectively adjustable gap may be at least one of void and filled with an appropriate material. Specifically, the material for filling the gap may be at least one of thermally conductive, electrically insulative, magnetically insulative and a combination thereof. More specifically, the gap-fill material may be a shield with a relatively lower profile vis-à-vis the shield blocks.

Figure 6A:
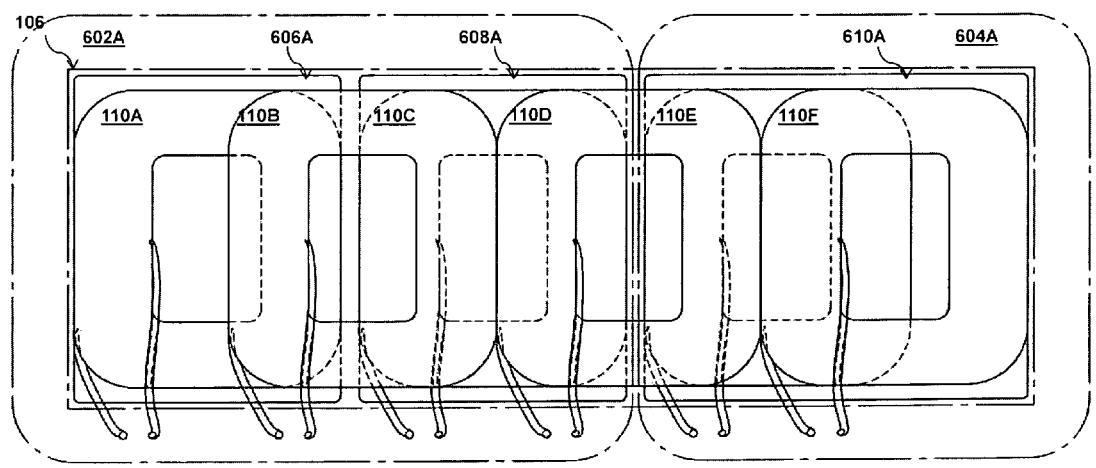
FIG. 6A depicts a fourth potential overall physical configuration in connection with the charging subsystem 102, and transmitter coil array 110 thereof, of FIG. 1, in accordance with one or more embodiments.

FIG. 6A depicts a fourth potential overall physical configuration in connection with the charging subsystem 102, and transmitter coil array 110 thereof, of FIG. 1, in accordance with one or more embodiments.

As depicted in FIG. 6A, the shield 106 may possess a composite modular design. For example, and in no way limiting the scope of the invention, the shield 106 may include at least two sets of shield blocks, wherein each of the two sets of shield blocks may possess homogeneous specifications, for instance material, constructional, dimensional, geometrical, spatial position and orientation specifications therefor. For purposes of clarity and expediency, the two sets of shield blocks may be hereinafter referred to as a first and second set of shield blocks 602A and 604A. For example, and in no way limiting the scope of the invention, the first set of shield blocks 602A may include a pair of shield blocks, namely a first and second shield blocks 606A and 608A, with homogeneous specification, for instance material, constructional, dimensional, geometrical, spatial position and orientation specifications therefor. For example, and in no way limiting the scope of the invention, the second set of shield blocks 604A may include a single shield block, namely a third shield block 610A with distinct specifications.

As depicted in FIG. 6A, for example, and in no way limiting the scope of the invention, in accordance with the fourth potential overall physical configuration the charging subsystem 102, and transmitter coil array 110 thereof, may possess the following material, constructional, dimensional, geometrical, spatial position and orientation specifications, namely:

1) the material of a heat sink metallic plate (not shown and numbered here explicitly) may be a metal, for instance silver;

2) the optional geometry of the heat sink metallic plate may be a thin (or laminar) three-dimensional (3D) solid rectangular cuboid with or without rounded corners;

3) the length, breadth and height, i.e. dimensions, of the heat sink metallic plate may be approximately >55 mm*>154 mm*>=1 mm;

4) the spatial position and orientation of the heat sink metallic plate relative to the shield 106 may be such that the heat sink metallic plate may be juxtaposed beneath the shield 106 and coupled therewith;

5) the material of the shield 106 may be ferrite;

6) the constructional design or structure of the shield 106 may be a composite modular type;

7) the total number of shield blocks 606A, 608A and 610A constituting the shield 106 may be 3;

8) the optional geometry of each of the shield blocks of the shield 106 may be a thin (or laminar) three-dimensional (3D) solid rectangular cuboid with or without rounded corners;

9) the length, breadth and height, i.e. dimensions, of the each of the shield blocks of the pair of shield blocks 606A and 608A of the shield 106 may be approximately 50 mm*43 mm*1 mm;

10) the length, breadth and height, i.e. dimensions, of the shield block 610A of the shield 106 may be approximately 55 mm*62 mm*1 mm;

11) the length and breadth, i.e. dimensions, of each of the transmitter coils in the transmitter coil array 110 may be approximately 50 mm*43 mm;

12) the total number of transmitter coils in the transmitter coil array 110 may be 6;

13) the optional geometry of each of the transmitter coils in the transmitter coil array 110 may be a thin three-dimensional (3D) hollow rectangular ring with rounded corners;

14) the relative spatial positioning of each of the transmitter coils in the transmitter coil array 110 with respect to the shield 106 may be such that each of the odd numbered transmitter coils, namely the first 110A, third 110C and fifth 110E in that order, may be directly coupled to the shield 106, and may be thus positioned thereupon, whereas each of the even numbered transmitter coils, namely the second 110B, fourth 110D and sixth 110F in that order, may be directly coupled to a pair of immediately preceding and proceeding odd numbered transmitter coils, flanking, or juxtaposed to, each other, and may be positioned immediately beneath each of the even numbered transmitter coils;

15) the relative inter-coil spatial positioning of the odd numbered transmitter coils may be such that the first 110A, third 110C and fifth 110E transmitter coils in that order may be juxtaposed in close vicinity to each other in a continuous linear fashion;

16) the relative inter-coil spatial positioning of the even numbered transmitter coils may be such that the second 110B, fourth 110D and sixth 110F transmitter coils in that order may be proximately juxtaposed to each other in a continuous linear fashion;

17) the relative inter-coil spatial positioning of both even and odd numbered transmitter coils may be such that each of the even numbered transmitter coils may partially overlap with a pair of immediately preceding and proceeding odd numbered transmitter coils;

18) the total inter transmitter coil array 110 and the shield 106 length-wise edge spacing may be approximately 5 mm, i.e. the total lengthwise spacing between the edges of the transmitter coil array 110 and the edges of the shield 106 may preferably be less than approximately 5 mm;

19) the total inter transmitter coil array 110 and the shield 106 breadth-wise edge spacing may be approximately 0 mm, i.e. the total breadth-wise spacing between the edges of the transmitter coil array 110 and the edges of the shield 106 may be approximately 0 mm;

20) the inter external proximal edge distance between the first and second transmitter coils 110A and 110B, i.e. the distance between the outer proximal edges of the first and second transmitter coils 110A and 110B, may be approximately 25 mm;

21) the distance between the outer distal edge of the first transmitter coil 110A and the outer distal edge of the second transmitter coil 110B, or the outer proximal edge of the fourth transmitter coil 110D, may be approximately 25 mm;

22) the distance between the outer distal edge of the second transmitter coil 110B, or the outer proximal edge of the fourth transmitter coil 110C, and the outer proximal edge of the fifth transmitter coil 110E may be approximately 24 mm;

23) the distance between the outer proximal edges of the fifth transmitter coil 110E and the sixth transmitter coil 110F may be approximately 22 mm;

24) the distance between the inner distal edge of the first transmitter coil 110A and the inner proximal edge of the second transmitter coil 110B may be approximately 7.6 mm;

25) the distance between the inner distal edge of the second transmitter coil 110B and the inner proximal edge of the third transmitter coil 110C may be approximately 3.6 mm;

26) the distance between the inner distal edge of the third transmitter coil 110C and the inner proximal edge of the fourth transmitter coil 110D may be approximately 4.6 mm;

27) the distance between the inner distal edge of the fourth transmitter coil 110D and the inner proximal edge of the fifth transmitter coil 110E may be approximately 6.6 mm;

28) the distance between the inner distal edge of the fifth transmitter coil 110E and the inner proximal edge of the sixth transmitter coil may be approximately 1.6 mm;

29) the distance between the inner distal edge of the fourth transmitter coil 110D and the inner proximal edge of the fifth transmitter coil 110E may be approximately 9.5 mm; and 30) the width of the selectively adjustable gap between the first and second shield blocks 606A and 608A may be approximately 3 mm; and 31) the width of the selectively adjustable gap between the second and third shield blocks may be approximately 3 mm.

Figure 6B:
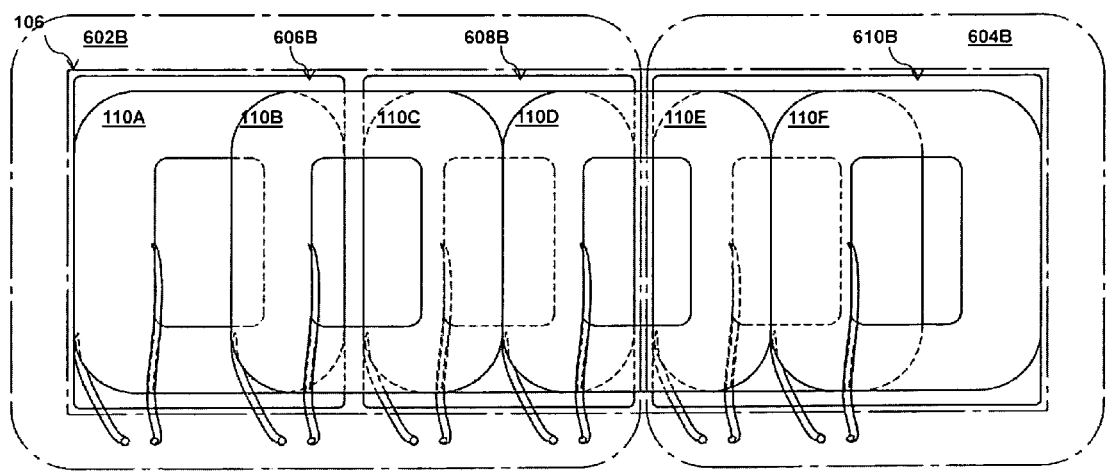
FIG. 6B depicts a fifth potential overall physical configuration in connection with the charging subsystem 102, and transmitter coil array 110 thereof, of FIG. 1, in accordance with one or more embodiments.

FIG. 6B depicts a fifth potential overall physical configuration in connection with the charging subsystem 102, and transmitter coil array 110 thereof, of FIG. 1, in accordance with one or more embodiments.

As depicted in FIG. 6B, the shield 106 may possess a composite modular design. For example, and in no way limiting the scope of the invention, the shield 106 may include at least two sets of shield blocks, wherein each of the two sets of shield blocks may possess homogeneous specifications, for instance material, constructional, dimensional, geometrical, spatial position and orientation specifications therefor. For purposes of clarity and expediency, the two sets of shield blocks may be hereinafter referred to as a first and second set of shield blocks 602B and 604B. For example, and in no way limiting the scope of the invention, the first set of shield blocks 602B may include a pair of shield blocks, namely a first and second shield blocks 606B and 608B, with homogeneous specifications, for instance material, constructional, dimensional, geometrical, spatial position and orientation specifications therefor. For example, and in no way limiting the scope of the invention, the second set of shield blocks 604B may include a single shield block, namely a third shield block 610B with distinct specifications.

As depicted in FIG. 6B, for example, and in no way limiting the scope of the invention, in accordance with the fourth potential overall physical configuration the charging subsystem 102, and transmitter coil array 110 thereof, may possess the following material, constructional, dimensional, geometrical, spatial position and orientation specifications, namely 1) the material of a heat sink metallic plate (not shown and numbered here explicitly) may be a metal, for instance silver;

2) the optional geometry of the heat sink metallic plate may be a thin (or laminar) three-dimensional (3D) solid rectangular cuboid with or without rounded corners;

3) the length, breadth and height, i.e. dimensions, of the heat sink metallic plate may be approximately >55 mm*>163.10 mm*>=1 mm;

4) the spatial position and orientation of the heat sink metallic plate relative to the shield 106 may be such that the heat sink metallic plate may be juxtaposed beneath the shield 106 and coupled therewith;

5) the material of the shield 106 may be ferrite;

6) the constructional design or structure of the shield 106 may be composite modular type;

7) the total number of shield blocks 606B, 608B and 610B constituting the shield 106 may be 3;

8) the optional geometry of each of the shield blocks of the shield 106 may be a thin (or laminar) three-dimensional (3D) solid rectangular cuboid with or without rounded corners;

9) the length, breadth and height, i.e. dimensions, of the each of the shield blocks of the pair of shield blocks, namely first and second 606B and 608B of the shield 106 may be approximately 55 mm*45.20 mm*1 mm;

10) the length, breadth and height, i.e. dimensions, of the third shield block 610B of the shield 106 may be approximately 55 mm*66.70 mm*1 mm;

11) the length and breadth, i.e. dimensions, of each of the transmitter coils in the transmitter coil array 110 may be approximately 53.20 mm*45.20 mm;

12) the total number of transmitter coils in the transmitter coil array 110 may be 6;

13) the optional geometry of each of the transmitter coils in the transmitter coil array 110 may be a thin three-dimensional (3D) hollow rectangular ring with rounded corners;

14) the relative spatial positioning of each of the transmitter coils in the transmitter coil array 110 with respect to the shield 106 may be such that each of the odd numbered transmitter coils, namely the first 110A, third 110C and fifth 110E in that order, may be directly coupled to the shield 106, and may be thus positioned thereupon, whereas each of the even numbered transmitter coils, namely the second 110B, fourth 110D and sixth 110F in that order, may be directly coupled to a pair of immediately preceding and proceeding odd numbered transmitter coils, flanking, or juxtaposed to, each other, and positioned immediately beneath each of the even numbered transmitter coils;

15) the relative inter-coil spatial positioning of the odd numbered transmitter coils may be such that the first 110A, third 110C and fifth 110E transmitter coils in that order may be juxtaposed in close vicinity to each other in a continuous linear fashion;

16) the relative inter-coil spatial positioning of the even numbered transmitter coils may be such that the second 110B, fourth 110D and sixth 110F transmitter coils in that order may be proximately juxtaposed to each other in a continuous linear fashion;

17) the relative inter-coil spatial positioning of both even and odd numbered transmitter coils may be such that each of the even numbered transmitter coils may partially overlap with a pair of immediately preceding and proceeding odd numbered transmitter coils;

18) the total inter transmitter coil array 110 and the shield 106 length-wise edge spacing may be approximately 5 mm, i.e. the total lengthwise spacing between the edges of the transmitter coil array 110 and the edges of the shield 106 may preferably be approximately 5 mm;

19) the total inter transmitter coil array 110 and the shield 106 breadth-wise edge spacing may be approximately 0 mm, i.e. the total breadth-wise spacing between the edges of the transmitter coil array 110 and the edges of the shield 106 may be approximately 0 mm;

20) the inter external proximal edge distance between the first and second transmitter coils 110A and 110B, i.e. the distance between the outer proximal edges of the first and second transmitter coils 110A and 110B, may be approximately 27.50 mm;

21) the distance between the outer distal edge of the first transmitter coil 110A and the outer distal edge of the second transmitter coil 110B, or the outer proximal edge of the fourth transmitter coil 110D, may be approximately 27.50 mm;

22) the distance between the outer distal edge of the second transmitter coil 110B, or the outer proximal edge of the fourth transmitter coil 110C, and the outer proximal edge of the fifth transmitter coil 110E may be approximately 23.70 mm;

23) the distance between the outer proximal edges of the fifth transmitter coil 110E and the sixth transmitter coil 110F may be approximately 24.50 mm;

24) the distance between the inner distal edge of the first transmitter coil 110A and the inner proximal edge of the second transmitter coil 110B may be approximately 7.9 mm;

25) the distance between the inner distal edge of the second transmitter coil 110B and the inner proximal edge of the third transmitter coil 110C may be approximately 1.1 mm;

26) the distance between the inner distal edge of the third transmitter coil 110C and the inner proximal edge of the fourth transmitter coil 110D may be approximately 4.9 mm;

27) the distance between the inner distal edge of the fourth transmitter coil 110D and the inner proximal edge of the fifth transmitter coil 110E may be approximately 4.1 mm;

28) the distance between the inner distal edge of the fifth transmitter coil 110E and the inner proximal edge of the sixth transmitter coil may be approximately 1.9 mm;

29) the width of the selectively adjustable gap between the first and second shield blocks 606B and 608B may be approximately 3 mm; and 30) the width of the selectively adjustable gap between the second and third shield blocks may be approximately 3 mm.

Figure 7A:
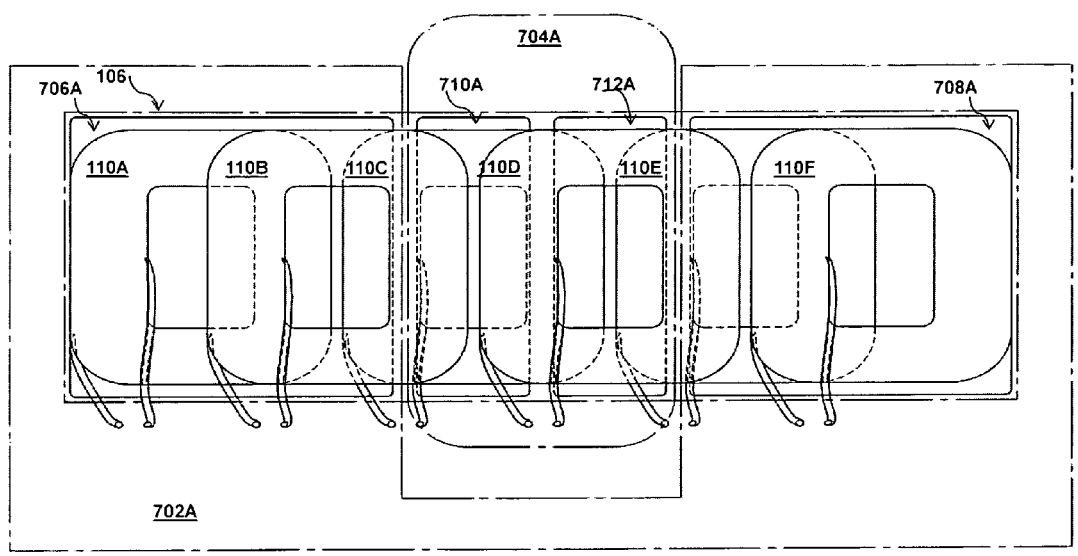
FIG. 7A depicts a seventh potential overall physical configuration in connection with the charging subsystem 102, and transmitter coil array 110 thereof, of FIG. 1, in accordance with one or more embodiments.

FIG. 7A depicts a seventh potential overall physical configuration in connection with the charging subsystem 102, and transmitter coil array 110 thereof, of FIG. 1, in accordance with one or more embodiments.

As depicted in FIG. 7A, the shield 106 may possess a composite modular design. For example, and in no way limiting the scope of the invention, the shield 106 may include at least two heterogeneous pairs of shield blocks, wherein each pair of shield blocks of the two pairs of shield blocks may possess homogeneous specifications, for instance material, constructional, dimensional, geometrical, spatial position and orientation specifications therefor. For purposes of clarity and expediency, the two heterogeneous pairs of shield blocks may be hereinafter referred to as a first and second pairs of shield blocks 702A and 704A. For example, and in no way limiting the scope of the invention, the first pair of shield blocks 702A may include a pair of shield blocks, namely a first and second shield blocks 706A and 708A, with unique homogeneous specifications, for instance material, constructional, dimensional, geometrical, spatial position and orientation specifications therefor. For example, and in no way limiting the scope of the invention, the second pair of shield blocks 704A may include a pair of shield blocks, namely a third and fourth shield blocks 710A and 712A with unique homogeneous specifications.

As depicted in FIG. 7A, for example, and in no way limiting the scope of the invention, in accordance with the fourth potential overall physical configuration the charging subsystem 102, and transmitter coil array 110 thereof, may possess the following material, constructional, dimensional, geometrical, spatial position and orientation specifications, namely 1) the material of a heat sink metallic plate (not shown and numbered here explicitly) may be a metal, for instance silver;

2) the optional geometry of the heat sink metallic plate may be a thin (or laminar) three-dimensional (3D) solid rectangular cuboid with or without rounded corners;

3) the length, breadth and height, i.e. dimensions, of the heat sink metallic plate may be approximately >55 mm*>155.50 mm*>=1 mm;

4) the spatial position and orientation of the heat sink metallic plate relative to the shield 106 may be such that the heat sink metallic plate may be juxtaposed beneath the shield 106 and coupled therewith;

5) the material of the shield 106 may be ferrite;

6) the constructional design or structure of the shield 106 may be a composite modular type;

7) the total number of shield blocks 706A, 708A, 710A and 712A constituting the shield 106 may be 4;

8) the optional geometry of each of the shield blocks of the shield 106 may be a thin (or laminar) three-dimensional (3D) solid rectangular cuboid with or without rounded corners;

9) the length, breadth and height, i.e. dimensions, of the each of the shield blocks of the first pair of shield blocks 702A, including the first and second shield blocks 706A and 708A, of the shield 106 may be approximately 55 mm*53.25 mm*1 mm;

10) the length, breadth and height, i.e. dimensions, of each of the shield blocks of the second pair of shield blocks 704A, including the third and fourth shield blocks 710A and 712A, of the shield 106 may be approximately 55 mm*18.50 mm*1 mm;

11) the length and breadth, i.e. dimensions, of each of the transmitter coils in the transmitter coil array 110 may be approximately 50 mm*43 mm;

12) the total number of transmitter coils in the transmitter coil array 110 may be 6;

13) the optional geometry of each of the transmitter coils in the transmitter coil array 110 may be a thin three-dimensional (3D) hollow rectangular ring with rounded corners;

14) the relative spatial positioning of each of the transmitter coils in the transmitter coil array 110 with respect to the shield 106 may be such that each of the odd numbered transmitter coils, namely the first 110A, third 110C and fifth 110E in that order, may be directly coupled to the shield 106, and may be thus positioned thereupon, whereas each of the even numbered transmitter coils, namely the second 110B, fourth 110D and sixth 110F in that order, may be directly coupled to a pair of immediately preceding and proceeding odd numbered transmitter coils, flanking, or juxtaposed to, each other, and positioned immediately beneath each of the even numbered transmitter coils;

15) the relative inter-coil spatial positioning of the odd numbered transmitter coils may be the first 110A, third 110C and fifth 110E transmitter coils in that order may be juxtaposed in close vicinity to each other in a continuous linear fashion;

16) the relative inter-coil spatial positioning of the even numbered transmitter coils may be the second 110B, fourth 110D and sixth 110F transmitter coils in that order may be proximately juxtaposed to each other in a continuous linear fashion;

17) the relative inter-coil spatial positioning of both even and odd numbered transmitter coils may be such that each of the even numbered transmitter coils may partially overlap with a pair of immediately preceding and proceeding odd numbered transmitter coils;

18) the total inter transmitter coil array 110 and the shield 106 length-wise edge spacing may be approximately 5 mm, i.e. the total lengthwise spacing between the edges of the transmitter coil array 110 and the edges of the shield 106 may preferably be approximately 5 mm;

19) the total inter transmitter coil array 110 and the shield 106 breadth-wise edge spacing may be approximately 0 mm, i.e. the total breadth-wise spacing between the edges of the transmitter coil array 110 and the edges of the shield 106 may be approximately 0 mm;

20) the inter external proximal edge distance between the first and second transmitter coils 110A and 110B, i.e. the distance between the outer proximal edges of the first and second transmitter coils 110A and 110B, may be approximately 22.50 mm;

21) the distance between the outer distal edge of the first transmitter coil 110A and the outer proximal edge of the fourth transmitter coil 110D may be approximately 24.50 mm;

22) the distance between the outer proximal edge of the fourth transmitter coil 110D and the outer proximal edge of the fifth transmitter coil 110E may be approximately 24.50 mm;

23) the distance between the outer proximal edges of the fifth transmitter coil 110E and the sixth transmitter coil 110F may be approximately 24.50 mm;

24) the distance between the inner distal edge of the first transmitter coil 110A and the inner proximal edge of the second transmitter coil 110B may be approximately 5.1 mm;

25) the distance between the inner distal edge of the second transmitter coil 110B and the inner proximal edge of the third transmitter coil 110C may be approximately 5.1 mm;

26) the distance between the inner distal edge of the third transmitter coil 110C and the inner proximal edge of the fourth transmitter coil 110D may be approximately 5.1 mm;

27) the distance between the inner distal edge of the fourth transmitter coil 110D and the inner proximal edge of the fifth transmitter coil 110E may be approximately 5.1 mm;

28) the distance between the inner distal edge of the fifth transmitter coil 110E and the inner proximal edge of the sixth transmitter coil may be approximately 5.1 mm;

29) the width of the selectively adjustable gap between the first and third shield blocks 706A and 710A may be approximately 4 mm;

30) the width of the selectively adjustable gap between the third and fourth shield blocks 710A and 712A may be approximately 4 mm; and 31) the width of the selectively adjustable gap between the fourth and second shield blocks 712A and 708A may be approximately 4 mm.

Figure 7B:
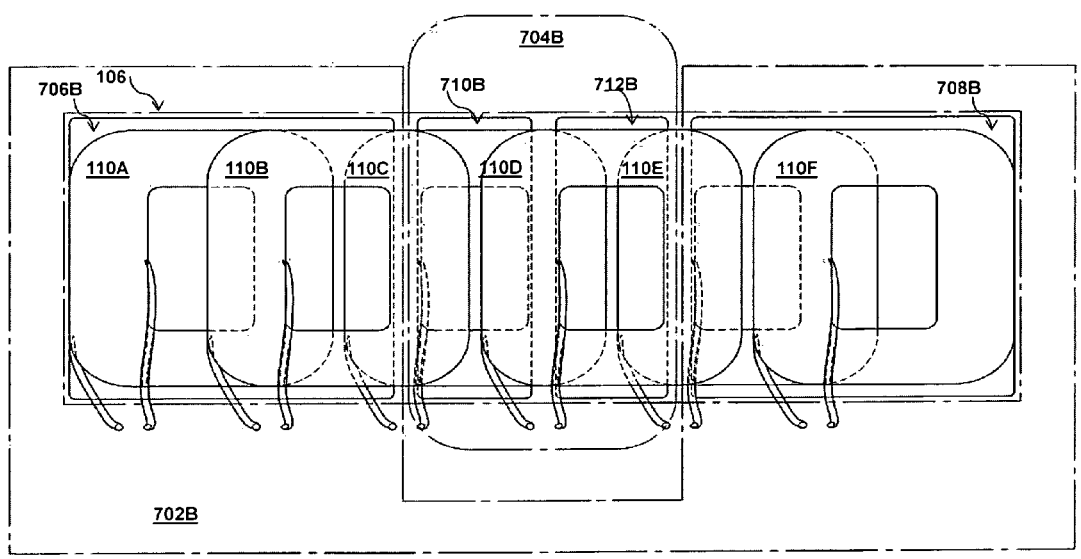
FIG. 7B depicts an eighth potential overall physical configuration in connection with the charging subsystem 102, and transmitter coil array 110 thereof, of FIG. 1, in accordance with one or more embodiments.

FIG. 7B depicts an eighth potential overall physical configuration in connection with the charging subsystem 102, and transmitter coil array 110 thereof, of FIG. 1, in accordance with one or more embodiments.

As depicted in FIG. 7B, the shield 106 may possess a composite modular design. For example, and in no way limiting the scope of the invention, the shield 106 may include at least two heterogeneous pairs of shield blocks, wherein each pair of shield blocks of the two pairs of shield blocks may possess homogeneous specifications, for instance material, constructional, dimensional, geometrical, spatial position and orientation specifications therefor. For purposes of clarity and expediency, the two heterogeneous pairs of shield blocks may be hereinafter referred to as a first and second pairs of shield blocks 702B and 704B. For example, and in no way limiting the scope of the invention, the first pair of shield blocks 702B may include a pair of shield blocks, namely a first and second shield blocks 706B and 708B, with unique homogeneous specifications, for instance material, constructional, dimensional, geometrical, spatial position and orientation specifications therefor. For example, and in no way limiting the scope of the invention, the second pair of shield blocks 704B may include a pair of shield blocks, namely a third and fourth shield blocks 710B and 712B with unique homogeneous specifications.

As depicted in FIG. 7B, for example, and in no way limiting the scope of the invention, in accordance with the fourth potential overall physical configuration the charging subsystem 102, and transmitter coil array 110 thereof, may possess the following material, constructional, dimensional, geometrical, spatial position and orientation specifications, namely 1) the material of a heat sink metallic plate (not shown and numbered here explicitly) may be a metal, for instance silver;

2) the optional geometry of the heat sink metallic plate may be a thin (or laminar) three-dimensional (3D) solid rectangular cuboid with or without rounded corners;

3) the length, breadth and height, i.e. dimensions, of the heat sink metallic plate may be approximately >56.20 mm*>161.80 mm*>=1 mm;

4) the spatial position and orientation of the heat sink metallic plate relative to the shield 106 may be such that the heat sink metallic plate may be juxtaposed beneath the shield 106 and coupled therewith;

5) the material of the shield 106 may be ferrite;

6) the constructional design or structure of the shield 106 may be a composite modular type;

7) the total number of shield blocks 706B, 708B, 710B and 712B constituting the shield 106 may be 4;

8) the optional geometry of each of the shield blocks of the shield 106 may be a thin (or laminar) three-dimensional (3D) solid rectangular cuboid with or without rounded corners;

9) the length, breadth and height, i.e. dimensions, of the each of the shield blocks of the first pair of shield blocks 702B, including the first and second shield blocks 706B and 708B, of the shield 106 may be approximately 56.20 mm*54.90 mm*1 mm;

10) the length, breadth and height, i.e. dimensions, of each of the shield blocks of the second pair of shield blocks 704B, including the third and fourth shield blocks 710B and 712B, of the shield 106 may be approximately 56.20 mm*20 mm*1 mm;

11) the length and breadth, i.e. dimensions, of each of the transmitter coils in the transmitter coil array 110 may be approximately 53.20 mm*45.20 mm;

12) the total number of transmitter coils in the transmitter coil array 110 may be 6;

13) the optional geometry of each of the transmitter coils in the transmitter coil array 110 may be a thin three-dimensional (3D) hollow rectangular ring with rounded corners;

14) the relative spatial positioning of each of the transmitter coils in the transmitter coil array 110 with respect to the shield 106 may be such that each of the odd numbered transmitter coils, namely the first 110A, third 110C and fifth 110E in that order, may be directly coupled to the shield 106, and are thus positioned thereupon, whereas each of the even numbered transmitter coils, namely the second 110B, fourth 110D and sixth 110F in that order, may be directly coupled to a pair of immediately preceding and proceeding odd numbered transmitter coils, flanking, or juxtaposed to, each other, and positioned immediately beneath each of the even numbered transmitter coils;

15) the relative inter-coil spatial positioning of the odd numbered transmitter coils may be such that the first 110A, third 110C and fifth 110E transmitter coils in that order may be juxtaposed in close vicinity to each other in a continuous linear fashion;

16) the relative inter-coil spatial positioning of the even numbered transmitter coils may be such that the second 110B, fourth 110D and sixth 110F transmitter coils in that order may be proximately juxtaposed to each other in a continuous linear fashion;

17) the relative inter-coil spatial positioning of both even and odd numbered transmitter coils may be such that each of the even numbered transmitter coils may partially overlap with a pair of immediately preceding and proceeding odd numbered transmitter coils;

18) the total inter transmitter coil array 110 and the shield 106 length-wise edge spacing may be approximately 5 mm, i.e. the total lengthwise spacing between the edges of the transmitter coil array 110 and the edges of the shield 106 may preferably be approximately 5 mm;

19) the total inter transmitter coil array 110 and the shield 106 breadth-wise edge spacing may be approximately 0.60 mm, i.e. the total breadth-wise spacing between the edges of the transmitter coil array 110 and the edges of the shield 106 may be approximately 0.60 mm;

20) the inter external proximal edge distance between the first and second transmitter coils 110A and 110B, i.e. the distance between the outer proximal edges of the first and second transmitter coils 110A and 110B, may be approximately 23.20 mm;

21) the distance between the outer distal edge of the first transmitter coil 110A and the outer proximal edge of the third transmitter coil 110B may be approximately 1.20 mm;

22) the distance between the outer distal edge of the first transmitter coil 110A and the outer proximal edge of the fourth transmitter coil 110D may be approximately 24.40 mm;

23) the distance between the outer distal edge of the second transmitter coil 110B and the outer proximal edge of the fourth transmitter coil 110D may be approximately 1.20 mm;

24) the distance between the outer distal edge of the second transmitter coil 110B and the outer proximal edge of the fifth transmitter coil 110E may be approximately 24.40 mm;

25) the distance between the outer distal edge of the third transmitter coil 110C and the outer proximal edge of the sixth transmitter coil 110F may be approximately 24.40 mm;

24) the distance between the inner distal edge of the first transmitter coil 110A and the inner proximal edge of the second transmitter coil 110B may be approximately 3.6 mm;

25) the distance between the inner distal edge of the second transmitter coil 110B and the inner proximal edge of the third transmitter coil 110C may be approximately 3.6 mm;

26) the distance between the inner distal edge of the third transmitter coil 110C and the inner proximal edge of the fourth transmitter coil 110D may be approximately 3.6 mm;

27) the distance between the inner distal edge of the fourth transmitter coil 110D and the inner proximal edge of the fifth transmitter coil 110E may be approximately 3.6 mm;

28) the distance between the inner distal edge of the fifth transmitter coil 110E and the inner proximal edge of the sixth transmitter coil may be approximately 3.6 mm;

29) the distance between the outer distal edge of the third transmitter coil 110C and the outer proximal edge of the fifth transmitter coil 110E may be approximately 1.20 mm;

30) the distance between the outer distal edge of the fourth transmitter coil 110D and the outer proximal edge of the sixth transmitter coil may be approximately 1.20 mm;

31) the width of the selectively adjustable gap between the first and third shield blocks 706B and 710B may be approximately 4 mm;

32) the width of the selectively adjustable gap between the third and fourth shield blocks 710B and 712B may be approximately 4 mm; and 31) the width of the selectively adjustable gap between the fourth and second shield blocks 712B and 708B may be approximately 4 mm.

In some embodiments, the one or more potential overall physical configurations in connection with the transmitter coil array 110 of the charging subsystem 102, of FIG. 1, disclosed in accordance with one or more embodiments may be selectively adopted thereby facilitating realization of one or more transmitter coil array 110 with corresponding overall specifications therefor.

Figure 8:
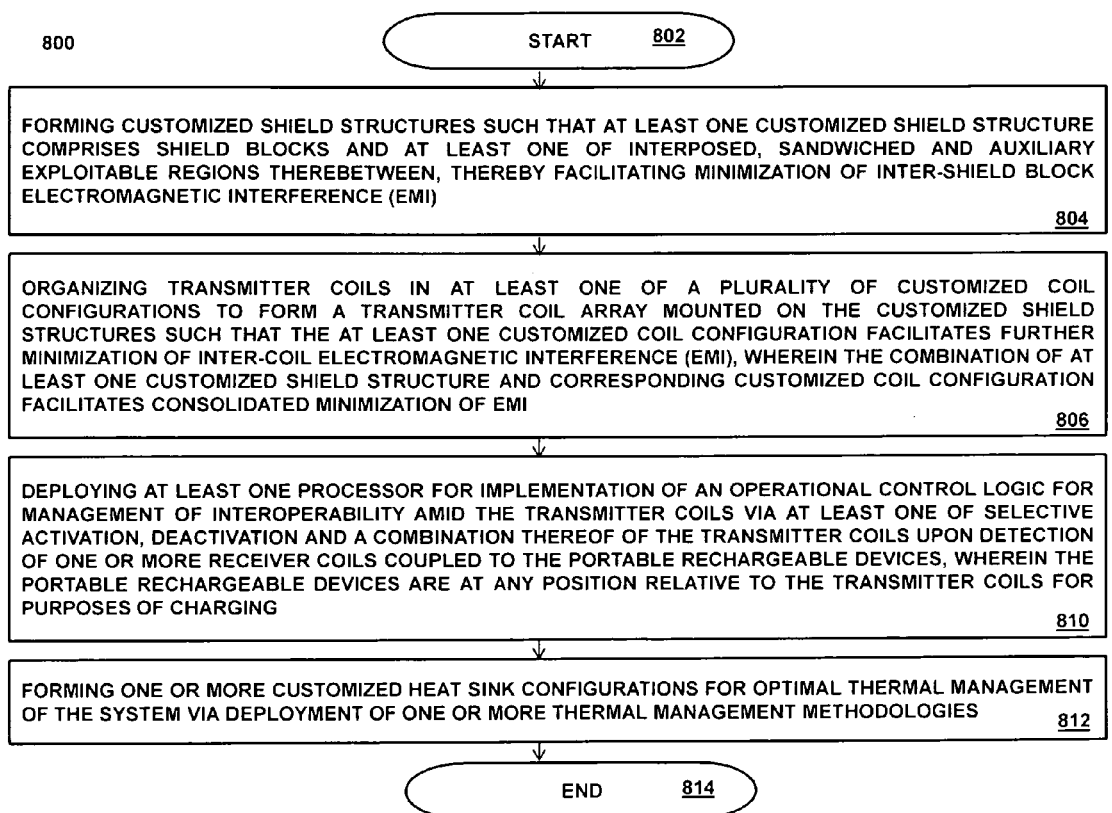
FIG. 8 depicts a flow diagram of a method for design and implementation of a system facilitating seamless and simultaneous wireless charging of portable rechargeable devices with free positioning capability, according to one or more embodiments.

FIG. 8 depicts a flow diagram of a method for design and implementation of a system facilitating seamless and simultaneous wireless charging of portable rechargeable devices with Adaptive Positioning Free (APF) capability, according to one or more embodiments.

The method 800 may start at step 802 and proceed to step 804. At step 804, the method 800 may comprise, or facilitate, forming a plurality of customized shield structures, wherein at least one of the customized shield structures comprises one or more shield blocks and at least one of interposed, sandwiched and auxiliary exploitable regions or spaces therebetween, thereby facilitating at least one of minimization and zeroization of inter-shield block Electromagnetic Interference (EMI).

In some embodiments, the customized shield structures may be formed using at least one of compact modular and monolithic shield, for instance shield 106 of FIG. 1. For example, and in no way limiting the scope of the invention, the material of the shield 106 may be ferrite.

For example, and in no way limiting the scope of the invention, the customized shield structures may be same as disclosed in detail in conjunction with FIGS. 5A-B, 6A-B and 7A-B respectively.

At step 804, the method 800 may further comprise, or facilitate, selectively adopting at least one of the plurality of customized shield structures formed, depending upon the requirements specifications.

In some embodiments, the at least one of interposed, sandwiched and auxiliary exploitable regions or spaces between the shield blocks may be at least one of void and filled. For example, and in no way limiting the scope of the invention, in some embodiments the spaces may be filled with an apt gap-fill material, which is at least one of electrically and magnetically insulative and thermally conductive. Specifically, the gap-fill material may be at least one of solid and perforated, and at least one of transparent, translucent and opaque with a thickness relatively lesser vis-à-vis the shield blocks.

At step 806, the method 800 may comprise, or facilitate, organizing or arranging one or more transmitter coils in at least one of a plurality of customized coil configurations to form at least one transmitter coil array mounted on at least one of the selectively adopted customized shield structures such that the customized coil configuration facilitate further minimization of inter-coil Electromagnetic Interference (EMI), wherein the combination of at least one the selectively adopted customized shield structure and corresponding customized coil configuration facilitates overall or consolidated minimization of the inter-coil EMI.

At step 806, the method 800 may further comprise, or facilitate, selectively adopting at least one of the plurality of customized coil configurations depending upon the requirements specifications.

In some embodiments, one or more of the plurality of customized coil configurations may comprise one or more transmitter coils arranged or organized in the form a multi-layer (-tier) structure or configuration, wherein each layer may comprise at least one transmitter coil array. For example, and in no way limiting the scope of the invention, the multi-layer (-tier) structure or configuration may comprise at least two layers.

At step 810, the method 800 may comprise, or facilitate, deploying at least one processor for implementation of an operational control logic for management of interoperability amid the transmitter coils via at least one of selective activation, deactivation and a combination thereof of the transmitter coils upon detection of one or more receiver coils coupled to the portable rechargeable devices; wherein the portable rechargeable devices may be manually positioned at any position relative to the transmitter coils for purposes of charging. For example, and in no way limiting the scope of the invention, the at least one processor may be a controller, for instance the first controller 108 of FIG. 1.

At step 812, the method 800 may comprise, or facilitate, forming one or more customized heat sink configurations for optimal thermal management of the system via deployment of one or more thermal management methodologies. For example, and in no way limiting the scope of the invention, the thermal management methodologies may comprise use of at least one of Phase Change Materials (PCMs) and synthetic diamond. Specifically, the PCMs may be classified into organic PCMs, inorganic, eutectic and hygroscopic materials.

The method 800 may end at step 814.

In some embodiments, an interoperability plan or scheme in connection with the transmitter coils of the transmitter coil array based at least in part on one or more customized shield structures, customized coil configurations and a combination thereof is disclosed, in accordance with the principles of the present invention.

In some embodiments, at least one of random, sequential and selectively controlled scanning of one or more transmitter coils in the transmitter coil array of the charging subsystem is disclosed, in accordance with the principles of the present invention. Specifically, each of the one or more transmitter coils may be scanned via pinging each of the transmitter coils in at least one of random, sequential and selectively controlled manner, wherein the inter-coil pinging time interval is at least one of negligibly and infinitesimally small. More specifically, the width of each pulse signal, often called a "ping", used for scanning each of the transmitter coils is small. For example, and in no way limiting the scope of the invention, the width of the pulse signal is approximately 100 ms. Consequently, the time period for completion of each scanning cycle comprising scanning via pinging each of the transmitter coils using a corresponding single pulse signal is relatively large thereby resulting in perceptibly (or noticeably) long wait time for scanning one or more transmitter coils confined to a given distal end (i.e. at least one of a given fartherest and ending point relative to a given starting point for a given direction of scanning in a given scanning cycle) of any given contiguous configuration of the transmitter coil array. For example in at least one of a left-to-right sequential directional scanning, for instance starting at the first transmitter coil, for instance 110A of FIG. 1, of the transmitter coil array 110 with six (6) transmitter coils, for instance 110A-F, and sequentially propagating to the sixth transmitter coil 110F the total time elapsed may be approximately 600 ms, whereas for right-to-left sequential directional scanning, for instance starting at the sixth transmitter coil, for instance 110F of FIG. 1, of the transmitter coil array 110 with six (6) transmitter coils, for instance 110A-F, and sequentially propagating to the first transmitter coil 110A the total time elapsed may be approximately 600 ms. In some embodiments, reduction in scanning cycle time period thereby facilitating minimization of time consumption is disclosed, in accordance with the principles of the present invention.

As used herein, the term "digital ping" refers to the application of a power signal in order to detect and identify a power receiver.

As used herein, the term "analog ping" refers to a method that does not involve waking up the receiver and starting digital communications. Typically zero or more analog pings precede the digital ping.

The implementation of the analog and digital pinging features may be performed in different embodiments. The advantage of using the analog or digital ping signal is the ability to determine whether or not the portable computing and communications device (or portable chargeable device) is still on the charging subsystem. The aforementioned usage of the analog or digital ping signal may be advantageous, for example, in the event that a second power source, i.e. battery of the portable computing and communications device (or portable chargeable device), is full and the receiver coil therefor is in standby mode. WPC also defines the usage of pinging signals in the transmitter coil to determine whether an object is placed on the charging subsystem and whether the possibly detected object is operable for wireless charging. It is also be noted that with the analog pinging, the receiver coil needs to be powered by the I/O voltage while with digital ping the receiver coil may use the power delivered by the transmitter coil.

Example Computer System

Figure 9:
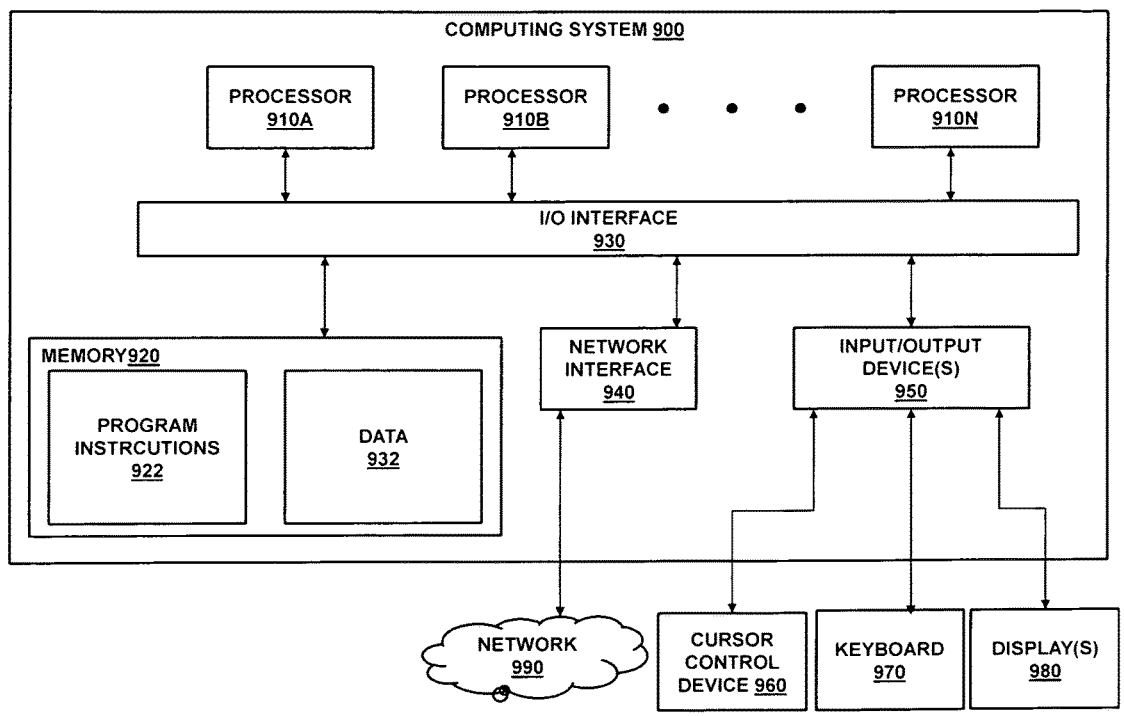
FIG. 9 depicts a computer system that may be a computing device and may be utilized in various embodiments of the present invention.

FIG. 9 depicts a standard or generic computer system that may be a computing device and may be utilized in various embodiments of the present invention.

Various embodiments of the method and system for simultaneously wirelessly charging portable chargeable devices based on wireless inductive power transfer with seamless free positioning capability, as described herein, may be executed on one or more computer systems, which may interact with various other devices. One such computer system is a generic or standard computer system 900 (not show here explicitly) illustrated by FIG. 9, which may in various embodiments implement any of the elements or functionality illustrated in FIGS. 1-8. In various embodiments, computer system 900 may be configured to implement one or more methods described above. The computer system 900 may be used to implement any other system, device, element, functionality or method of the above-described embodiments. In the illustrated embodiments, computer system 900 may be configured to implement one or more methods as processor-executable executable program instructions 922 (not show here explicitly) (e.g., program instructions executable by processor(s) 910A-N (not show here explicitly)) in various embodiments.

In the illustrated embodiment, computer system 900 includes one or more processors 910A-N coupled to a system memory 920 (not show here explicitly) via an input/output (I/O) interface 930 (not show here explicitly). The computer system 900 further includes a network interface 940 (not show here explicitly) coupled to I/O interface 930, and one or more input/output devices 950 (not show here explicitly), such as cursor control device 960 (not show here explicitly), keyboard 970 (not show here explicitly), and display(s) 980 (not show here explicitly). In various embodiments, any of components may be utilized by the system to receive user input described above. In various embodiments, a user interface (e.g., user interface) may be generated and displayed on display 980. In some cases, it is contemplated that embodiments may be implemented using a single instance of computer system 900, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements. In another example, multiple nodes may implement computer system 900 in a distributed manner.

In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 900 may be a uniprocessor system including one processor 910 (not show here explicitly), or a multiprocessor system including several processors 910 (e.g., two, four, eight, or another suitable number) (not show here explicitly). Processors 910A-N may be any suitable processor capable of executing instructions. For example, in various embodiments processors 910 may be general-purpose or embedded processors implementing any of a variety of instruction set architectures (ISAs), such as the x96, POWERPC®, SPARC®, or MIPS® ISAs, or any other suitable ISA. In multiprocessor systems, each of processors 910A-N may commonly, but not necessarily, implement the same ISA.

System memory 920 (not show here explicitly) may be configured to store program instructions 922 (not show here explicitly) and/or data 932 (not show here explicitly) accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 920. In other embodiments, program instructions and/or data may be received, sent or stored upon different types of computer-accessible media or on similar media separate from system memory 920 or computer system 900.

In one embodiment, I/O interface 930 (not show here explicitly) may be configured to coordinate I/O traffic between processor 910, system memory 920, and any peripheral devices in the device, including network interface 940 or other peripheral interfaces, such as input/output devices 950 (not show here explicitly). In some embodiments, I/O interface 930 may perform any necessary protocol, timing or other data transformations to convert data signals from one components (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 (not show here explicitly) may be configured to allow data to be exchanged between computer system 900 and other devices attached to a network (e.g., network 990) (not show here explicitly), such as one or more external systems or between nodes of computer system 900. In various embodiments, network 990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 (not show here explicitly) may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 950 (not show here explicitly) may, in some embodiments, include one or more display terminals, keyboards, keypads, touchpads, scanning devices, voice or optical recognition devices, or any other devices suitable for entering or accessing data by one or more computer systems 900. Multiple input/output devices 950 (not show here explicitly) may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940 (not show here explicitly).

Those skilled in the art will appreciate that computer system 900 (not show here explicitly) is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 900 (not show here explicitly) may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 (not show here explicitly) may be transmitted to computer system 900 (not show here explicitly) via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A system for seamlessly and simultaneously wirelessly charging portable chargeable devices with free positioning capability, the system comprising:

a charging subsystem comprising:

at least a customized heat sink configuration for optimal thermal management, wherein the customized heat sink is designed based on thermal management methodologies comprising use of Phase Change Materials (PCMs), at least a single-layer customized shield structure for minimization of interference, and at least a multi-layer customized coil configuration forming a corresponding transmitter coil array, wherein the corresponding transmitter coil array comprises:

a first plurality of transmitter coils juxtaposed to each other and coupled to the customized shield structure such that the first plurality of transmitter coils is confined to a first layer relative to the surface of the single-layer customized shield structure, and a second plurality of transmitter coils, wherein each of the second plurality of transmitter coils is overlappingly coupled to at least a pair of the first plurality of transmitter coils in juxtaposition and positioned thereunder such that the second plurality of transmitter coils are confined to a second layer relative to the surface of the single-layer customized shield structure;

at least a controller for scanning the transmitter coils and at least one of selectively activating and deactivating the transmitter coils based on the detection of receiver coils positioned at any position relative to the transmitter coils; and a portable chargeable device comprising a receiver coil, wherein the system facilitates minimization of interference between the transmitter coils in juxtaposition.

2. The system of claim 1, wherein there is no physical demarcation between at least one individual coil at least one of juxtaposed, overlappingly coupled to at least one other individual coil, and combinations thereof, wherein each of such at least one and one other individual coils correspondingly belong to the first and second plurality of transmitter coils of the transmitter coil array, and wherein each of such at least one and one other individual coils is correspondingly confined to the first and second layers, of the multi-layer customized coil configuration, relative to the surface single-layer customized shield structure thereby facilitating streamlined, simultaneous and seamless free positioning of the portable rechargeable devices on the charging subsystem.

3. The system of claim 1, wherein the transmitter coils may be at least one of selectively activated and deactivated using the controller thereby facilitating minimization of interference between the transmitter coils.

4. The system of claim 1, wherein the at least one single-layer customized shield structure possesses at least one of a composite modular and monolithic structure thereby facilitating minimization of Electromagnetic Interference (EMI).

5. The system of claim 4, wherein the at least one single-layer customized shield structure comprises one or more sets of shield blocks comprising one or more shield blocks with heterogeneous specifications such that each individual set of the sets of shield blocks comprises one or more shield blocks with homogeneous specifications.

6. The system of claim 5, wherein each shield block of the sets of shield blocks is juxtaposed in at least one of proximity and vicinity to each other thereby resulting in at least one of presence and absence of a selectively adjustable space therebetween.

7. The system of claim 6, wherein the selectively adjustable space further facilitates at least one of zeroization and minimization of inter-shield block EMI.

8. The system of claim 6, wherein the selectively adjustable space may be at least one of void and filled with a material possessing apt specifications.

9. The system of claim 8, wherein the material may be at least one of thermally conductive, electrically, magnetically insulative and a combination thereof.

10. The system of claim 8, wherein the material may be at least one of solid and perforated and at least one of transparent, translucent and opaque.

11. The system of claim 1, wherein the multi-layer customized coil configuration may comprise one or more transmitter coils arranged in the form a multi-layer structure, wherein each layer may comprise at least one transmitter coil array.

12. The system of claim 11, wherein the multi-layer structure may comprise at least two layers.

13. The system of claim 1, wherein the thermal management methodologies comprise use of at least one of Phase Change Materials (PCMs) and synthetic diamond.

14. The system of claim 13, wherein the PCMs may be classified into organic PCMs, inorganic, eutectic and hygroscopic materials.

15. A method for design and implementation of a system facilitating seamless and simultaneous wireless charging of portable rechargeable devices with free positioning capability, the method comprising:

forming a plurality of single-layer customized shield structures for selective adoption and deployment of at least one the single-layer plurality of customized shield structures formed, wherein at least one of the single-layer customized shield structures comprises:

one or more shield blocks, and at least one of interposed and sandwiched exploitable regions or spaces therebetween, thereby facilitating minimization of inter-shield block Electromagnetic Interference (EMI);

organizing one or more transmitter coils in at least one of a plurality of multi-layer customized coil configurations to form at least one transmitter coil array mounted on at least one of the selectively adopted and deployed customized shield structures such that the customized coil configuration facilitates further minimization of inter-coil Electromagnetic Interference (EMI), wherein the combination of at least one of the selectively adopted and deployed single-layer customized shield structure and corresponding multi-layer customized coil configuration facilitates consolidated minimization of EMI; and deploying at least one processor for implementation of an operational control logic for management of interoperability amid the transmitter coils via at least one of selective activation, deactivation and a combination thereof of the transmitter coils upon detection of one or more receiver coils coupled to the portable rechargeable devices, wherein the portable rechargeable devices are at any position relative to the transmitter coils for purposes of charging; and forming one or more customized heat sink configurations for optimal thermal management of the system via deployment of one or more thermal management methodologies.

16. The method of claim 15, wherein the system facilitates seamless and simultaneous wireless charging of at least two portable rechargeable devices with free positioning capability.

17. The method of claim 15, wherein the plurality of customized shield structures is formed using at least one of composite modular and monolithic electromagnetic shield.

18. The method of claim 17, wherein the at least one of composite modular and monolithic electromagnetic shield may possesses at least one of varying material, constructional, geometrical, dimensional, spatial positional, spatial, orientational and a combination thereof.

19. The method of claim 15, wherein the one or more transmitter coils are at least one of virtually and logically partitioned into one or more one or more homogeneously populated sets of transmitter coils thereby facilitating concurrent scanning of each of the homogeneously populated sets of transmitter coils using at least one processor.

20. The method of claim 15, further comprising implementing an optimal interoperability plan for the one or more transmitter coils based on at least one of selective activation and deactivation of the one or more transmitter coils.

21. The method of claim 15, further comprising optimally scanning via pinging each of the one or more transmitter coils based on logical partitioning of the transmitter coil array into at least a pair of sets of transmitter coils managed using at least one processor.

22. The method of claim 21, wherein the ping signal comprises at least one of an analog ping signal and a digital ping signal.

* * * * *